INVENTORS
Sidney Krakauer
Salomon Musikant
David J. Rosenberg
BY
Synnestvedt & Lechner
ATTORNEYS

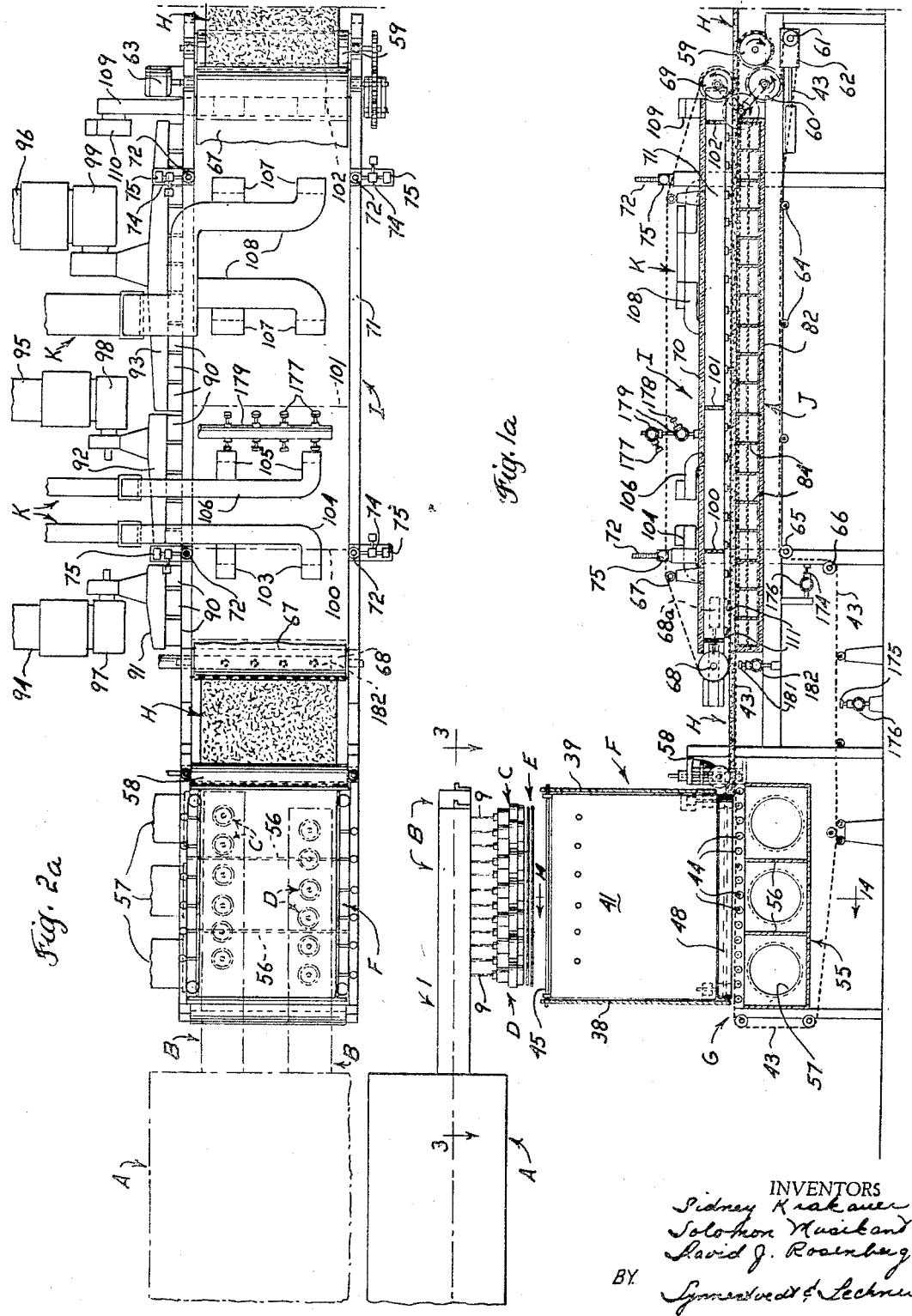

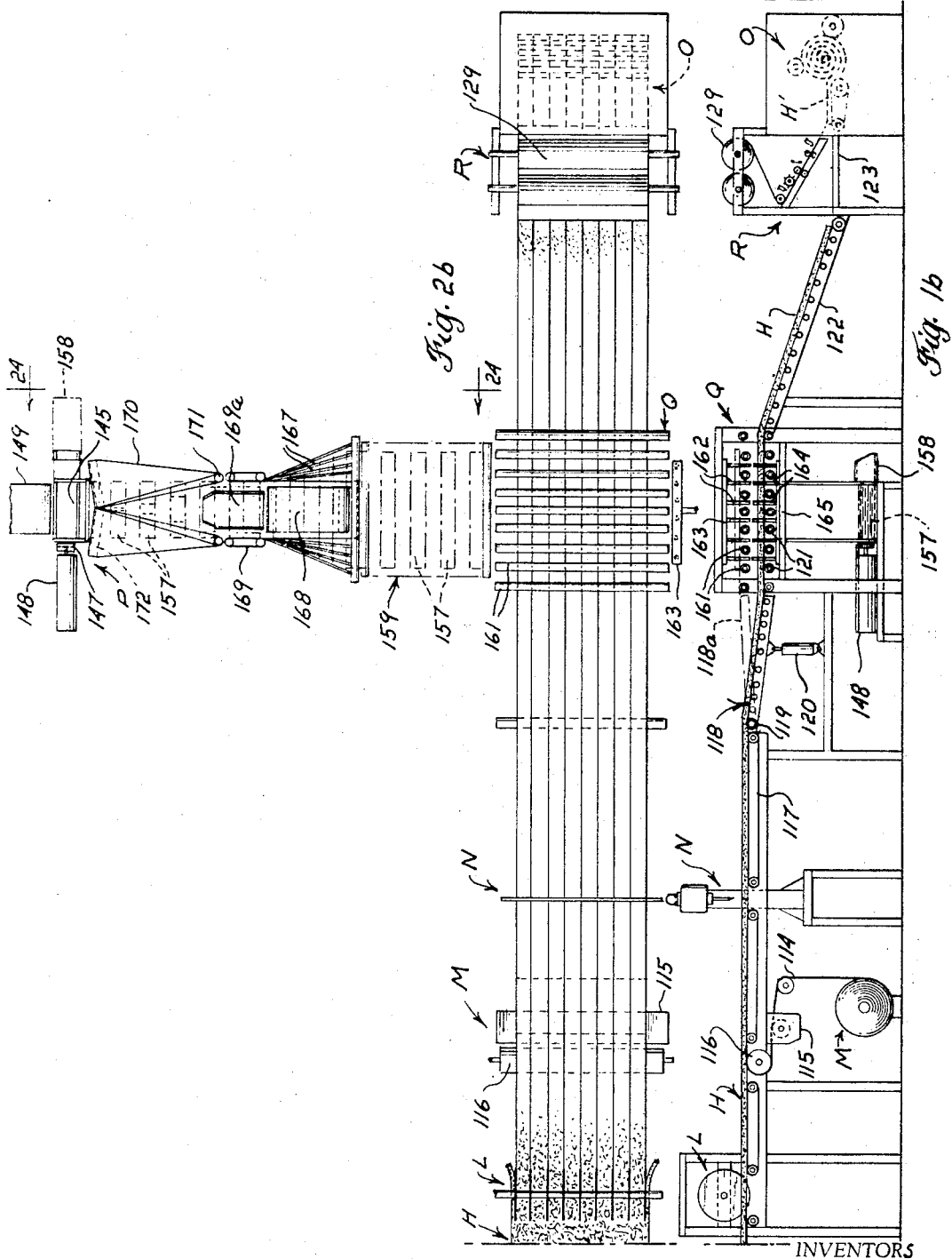

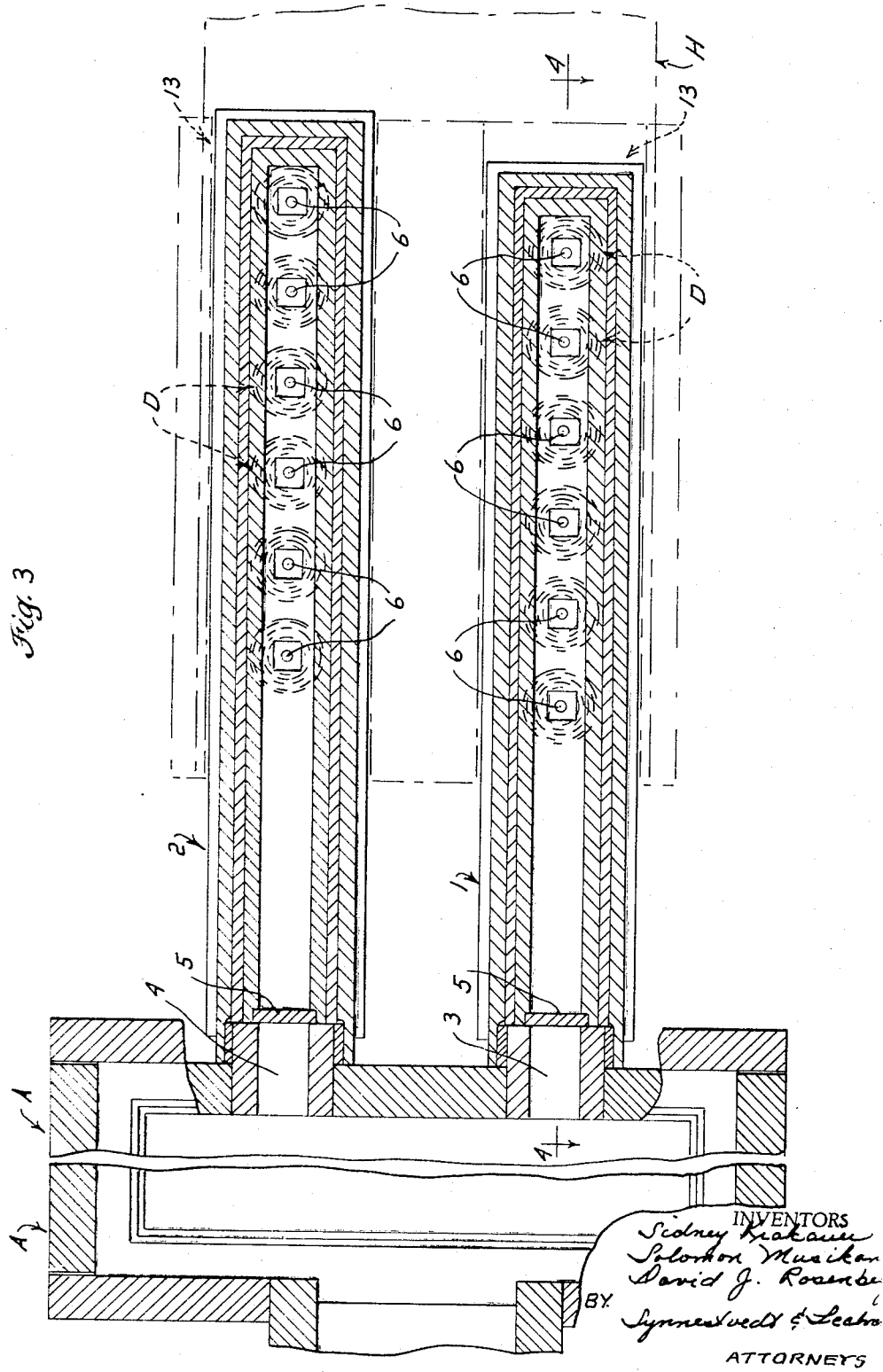

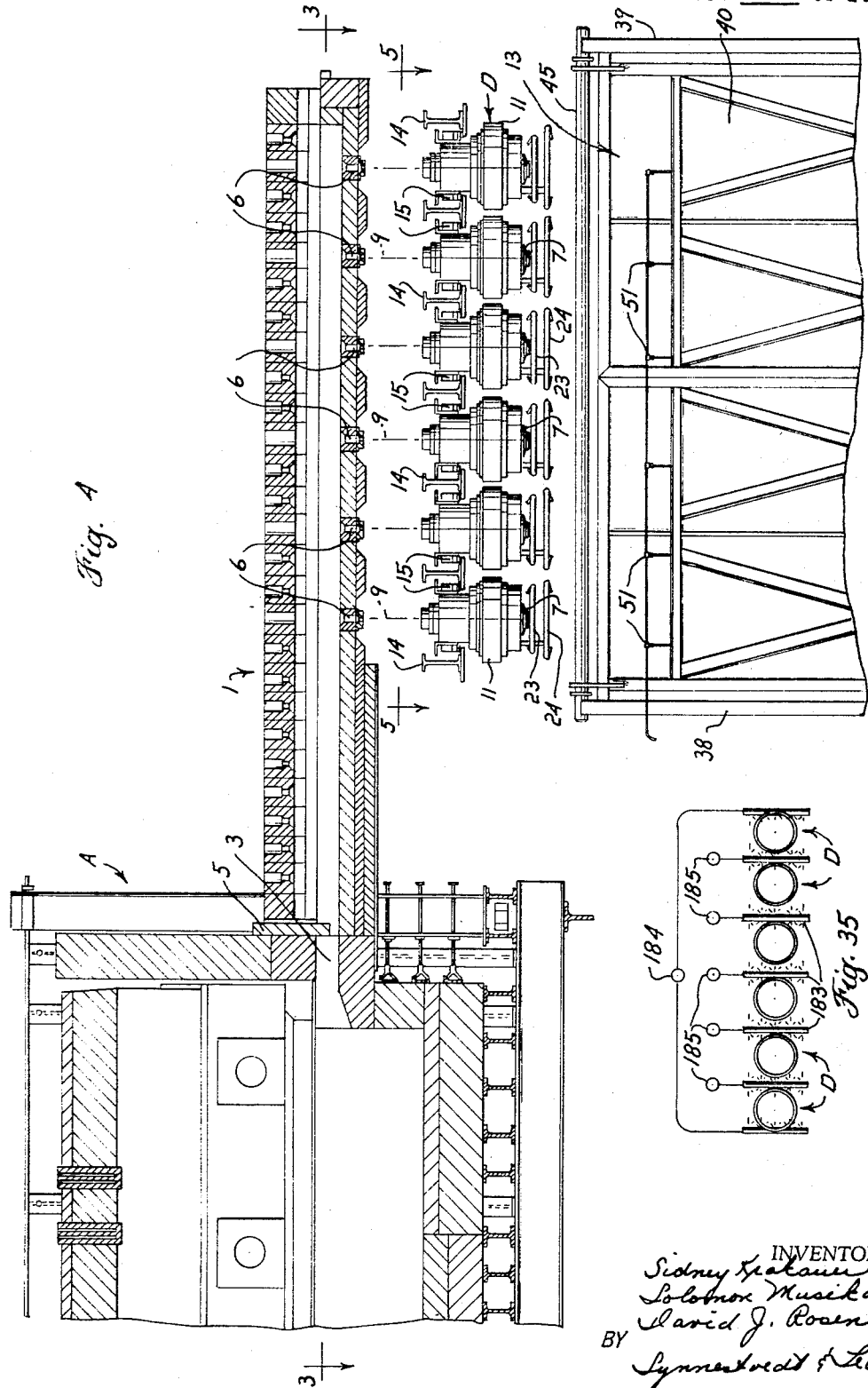

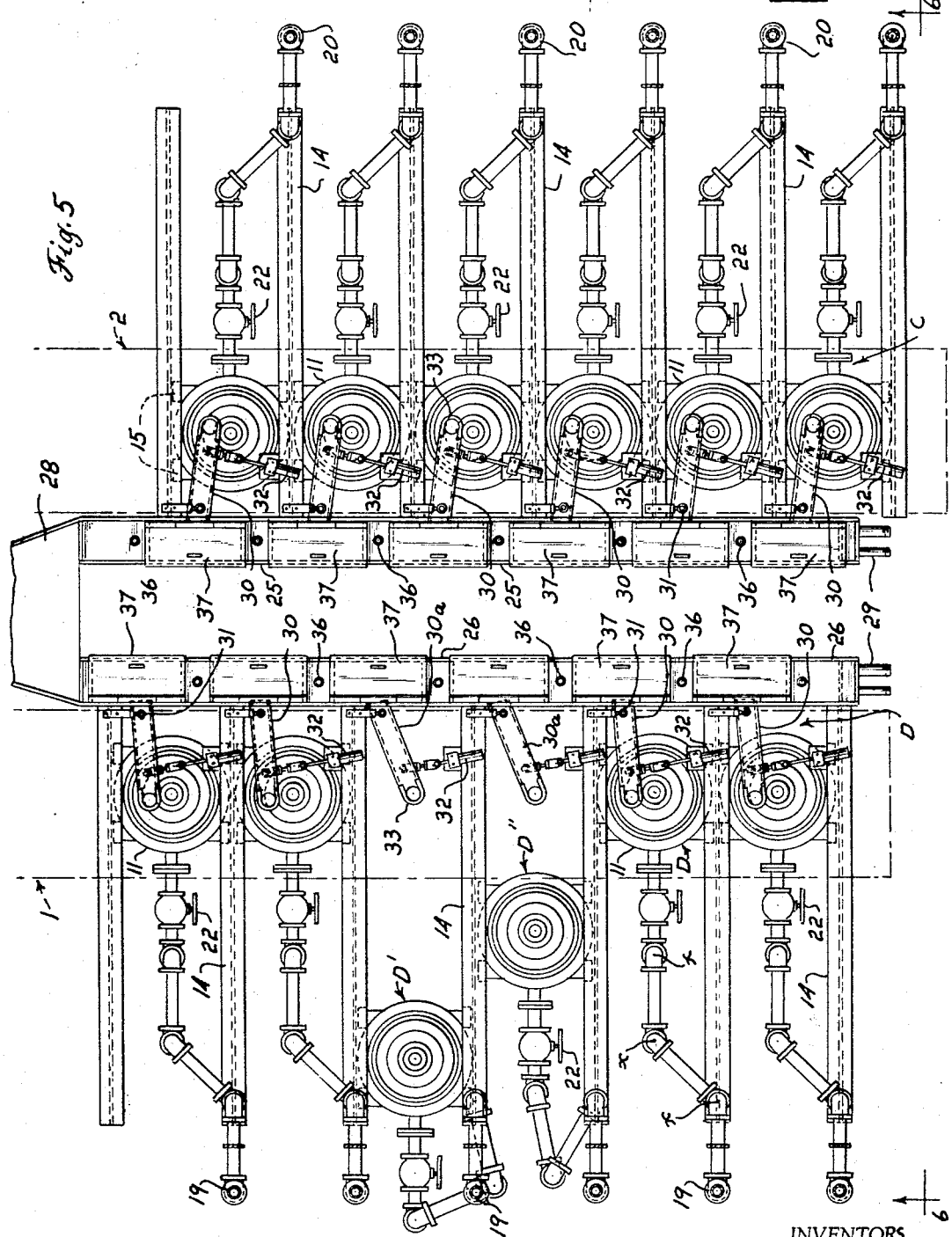

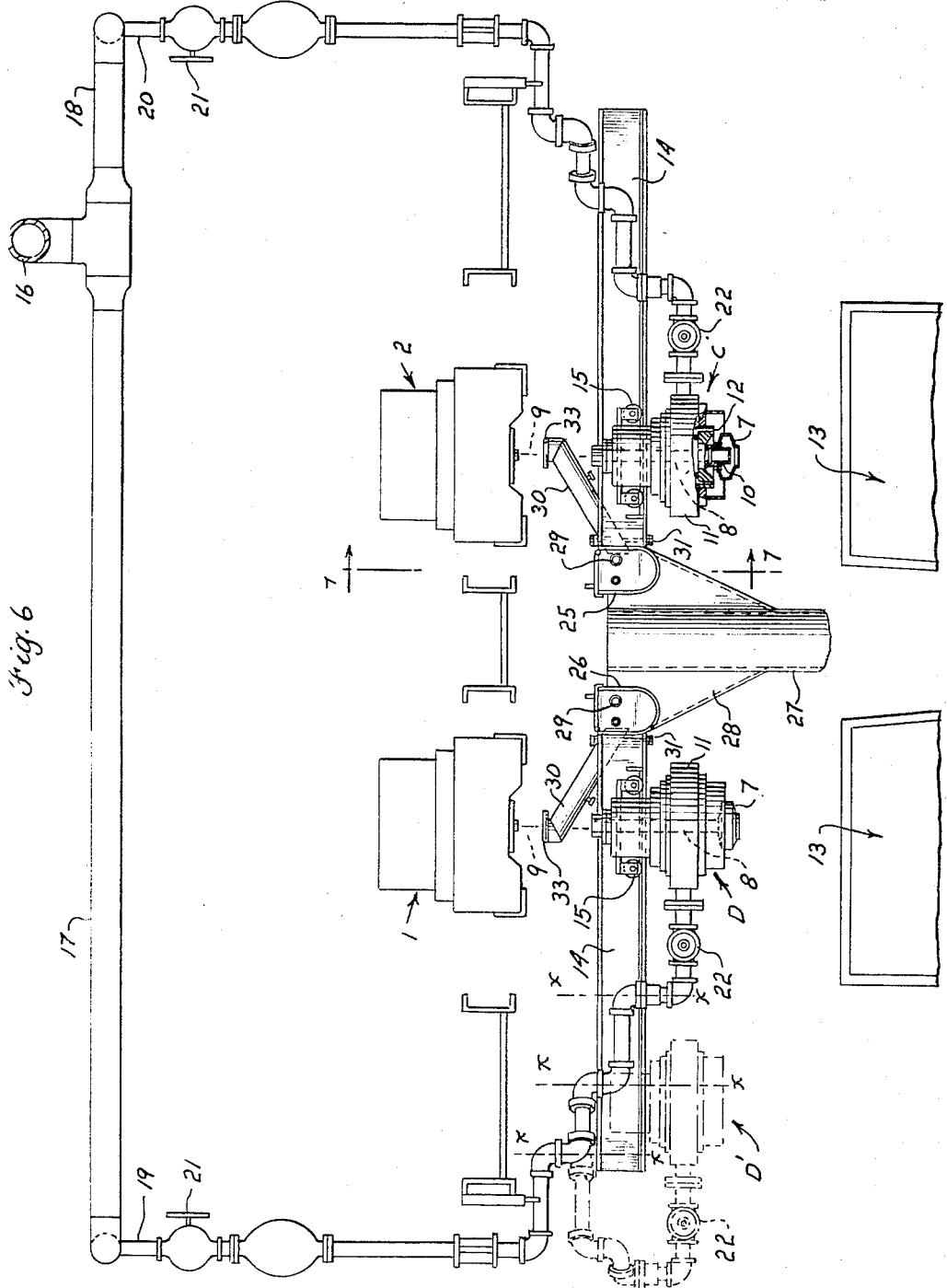

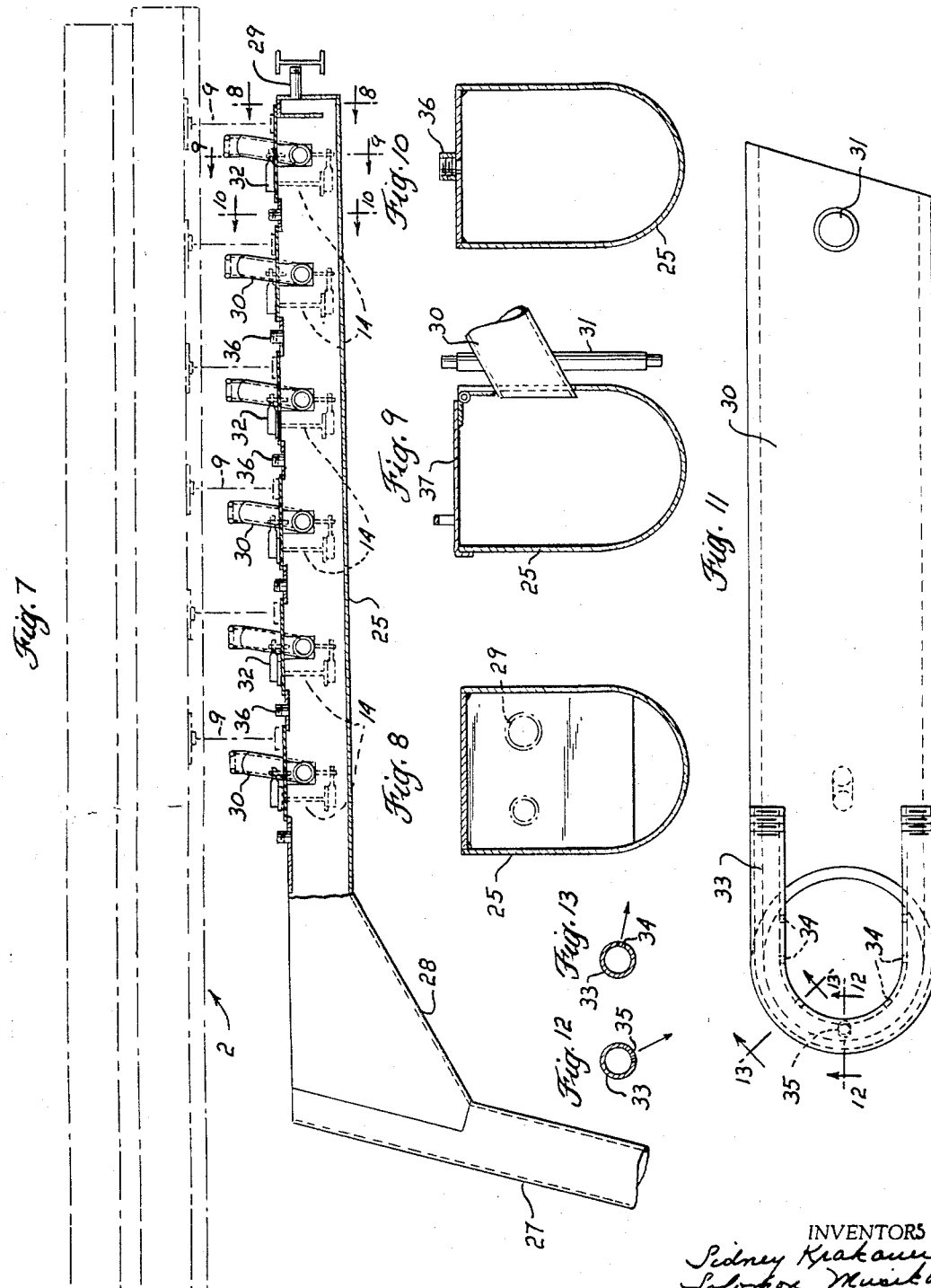

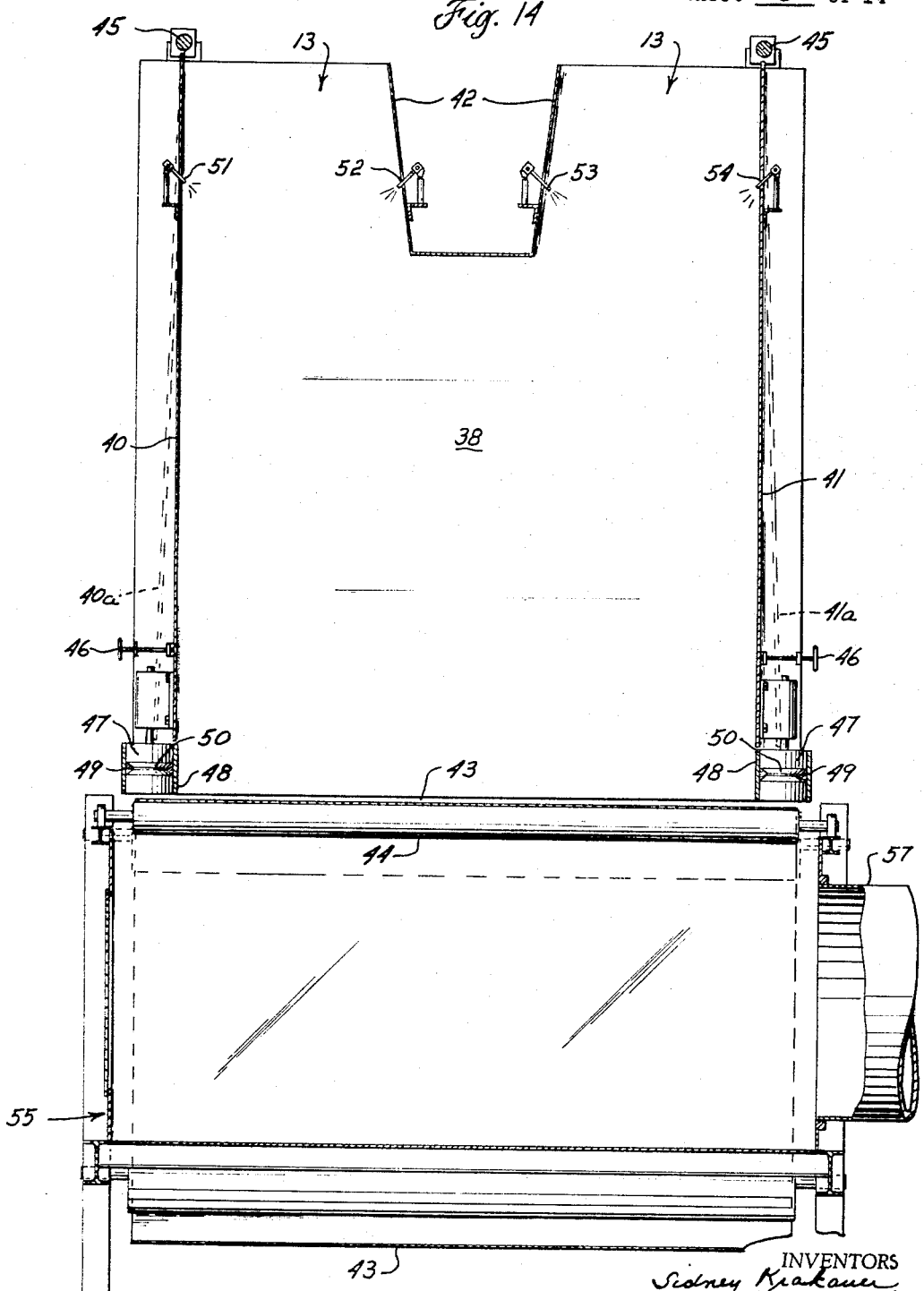

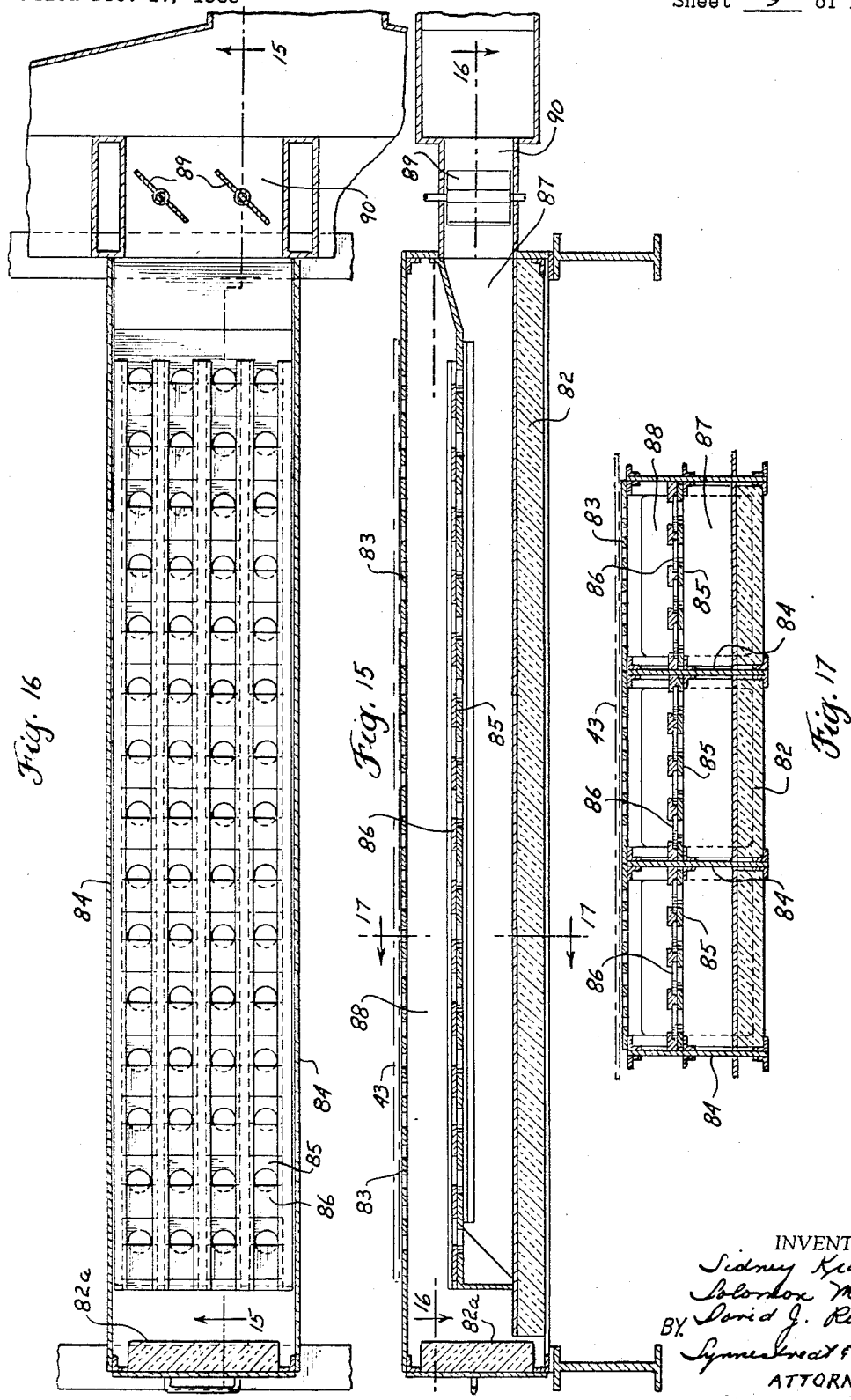

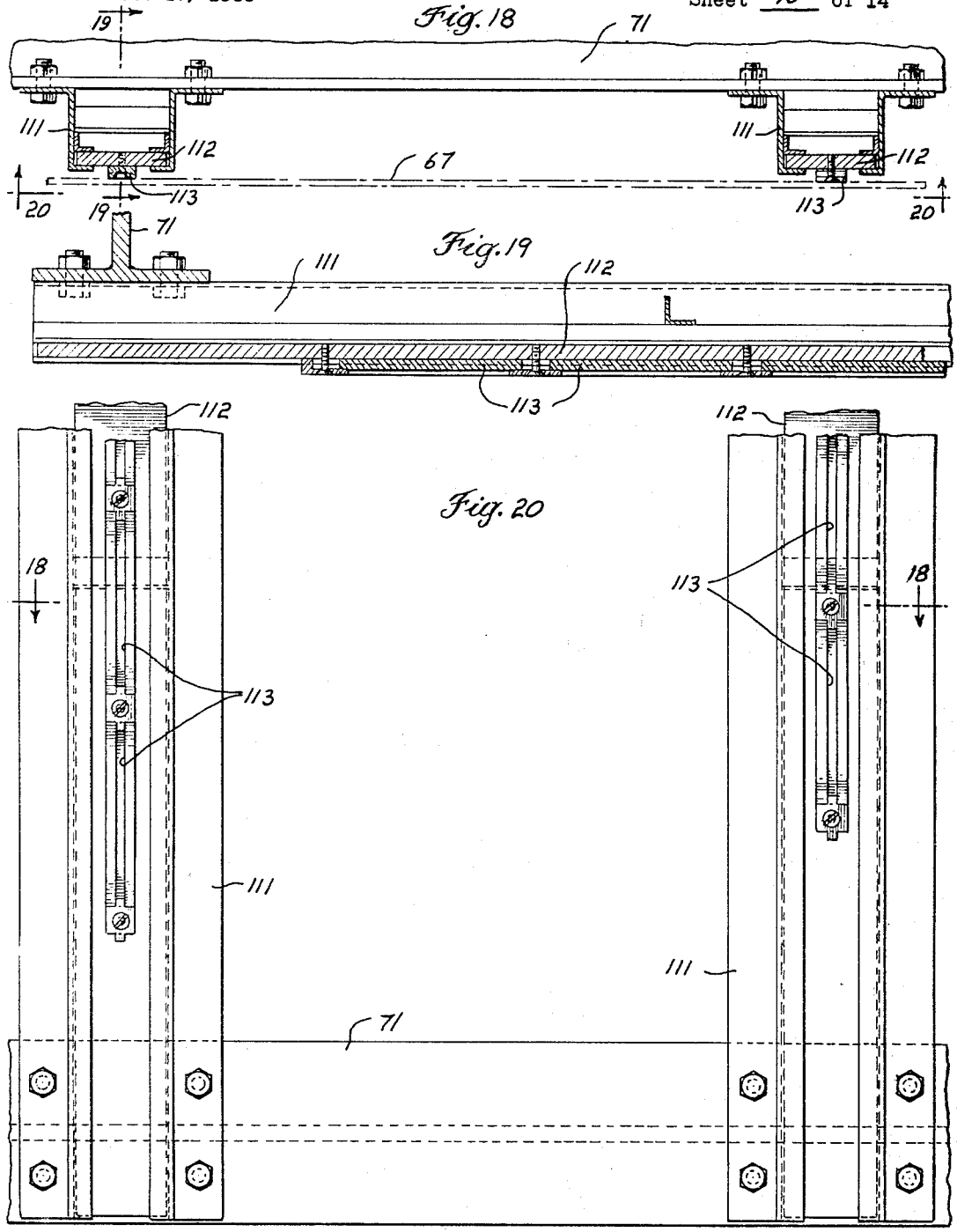

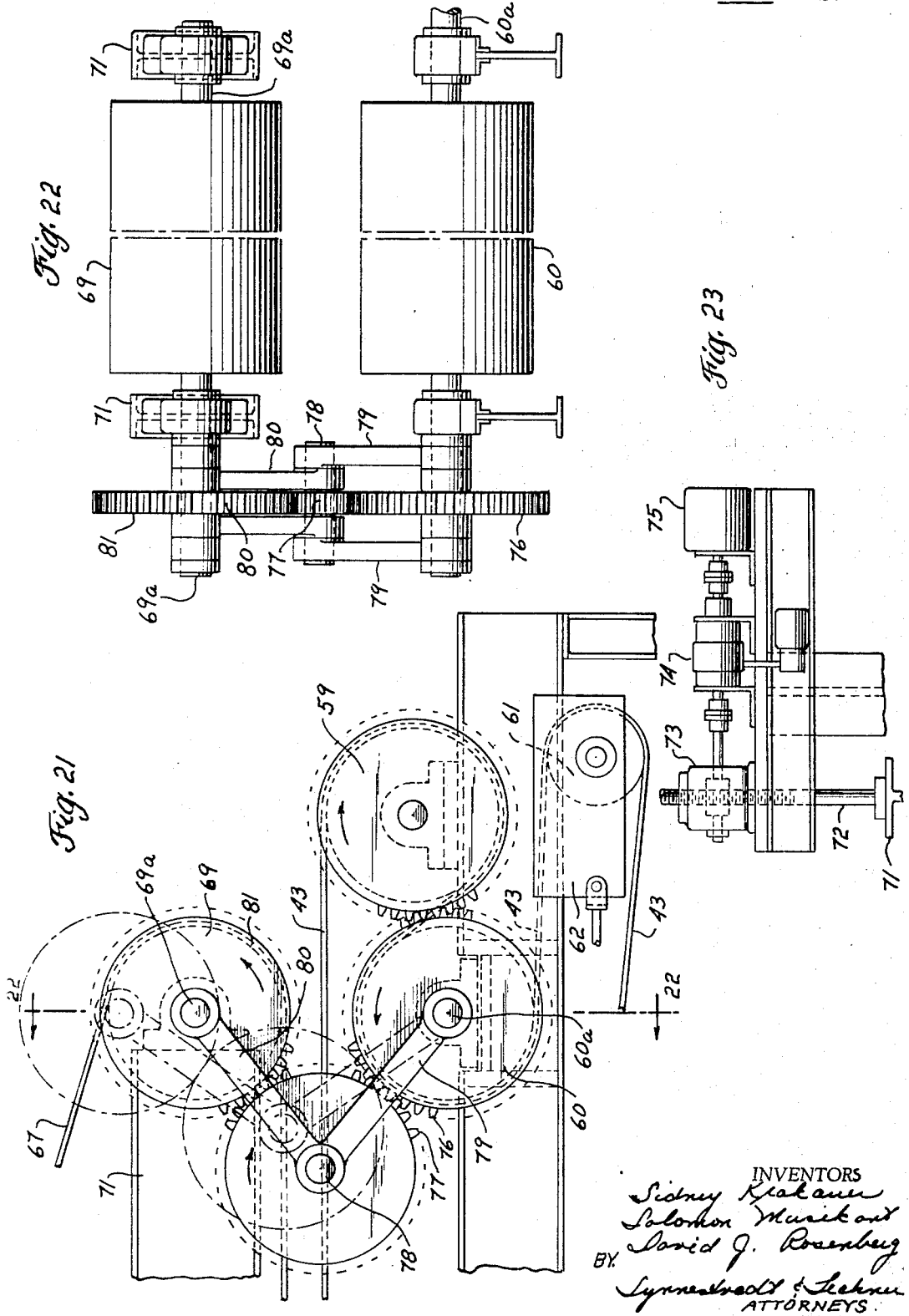

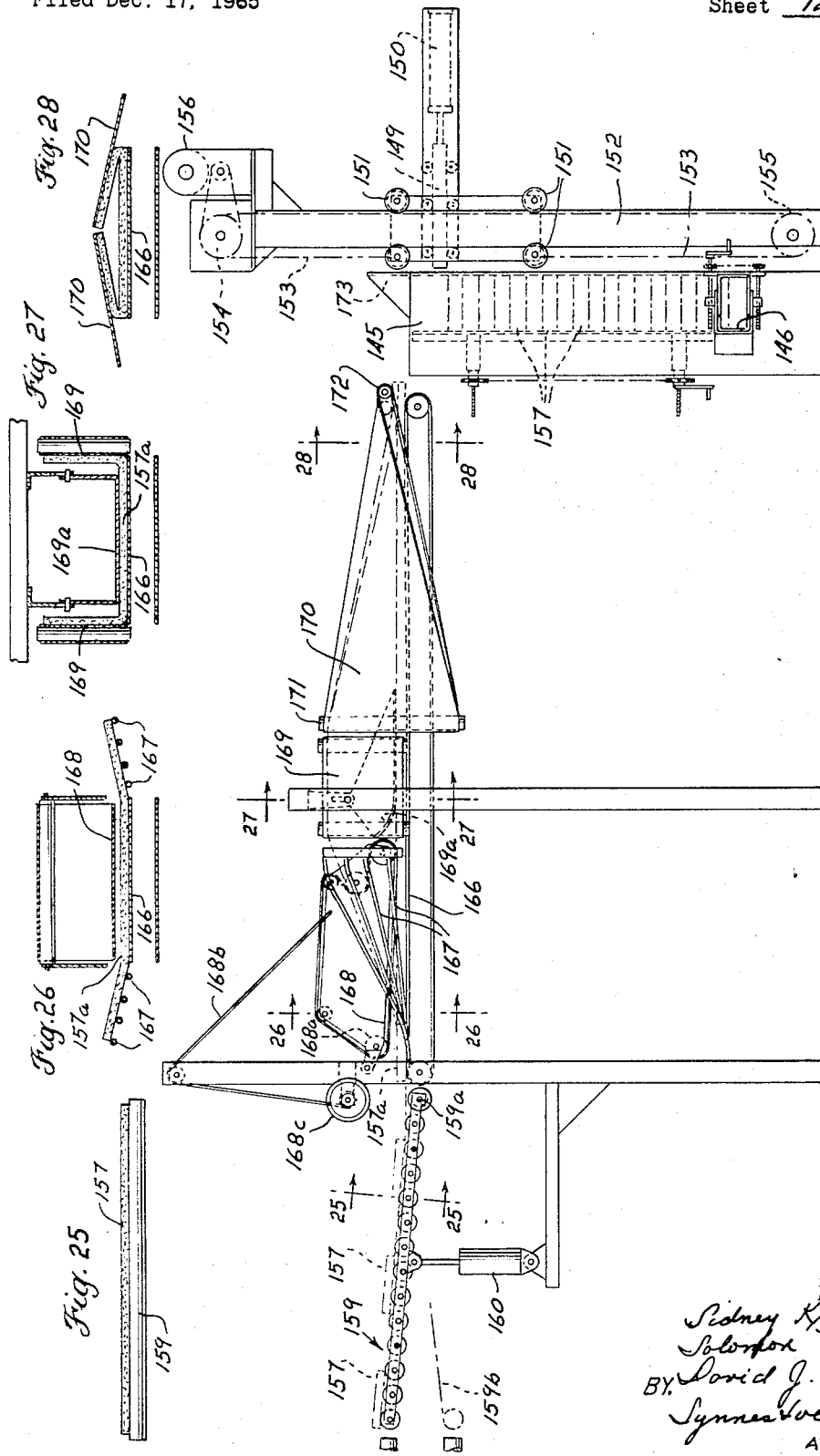

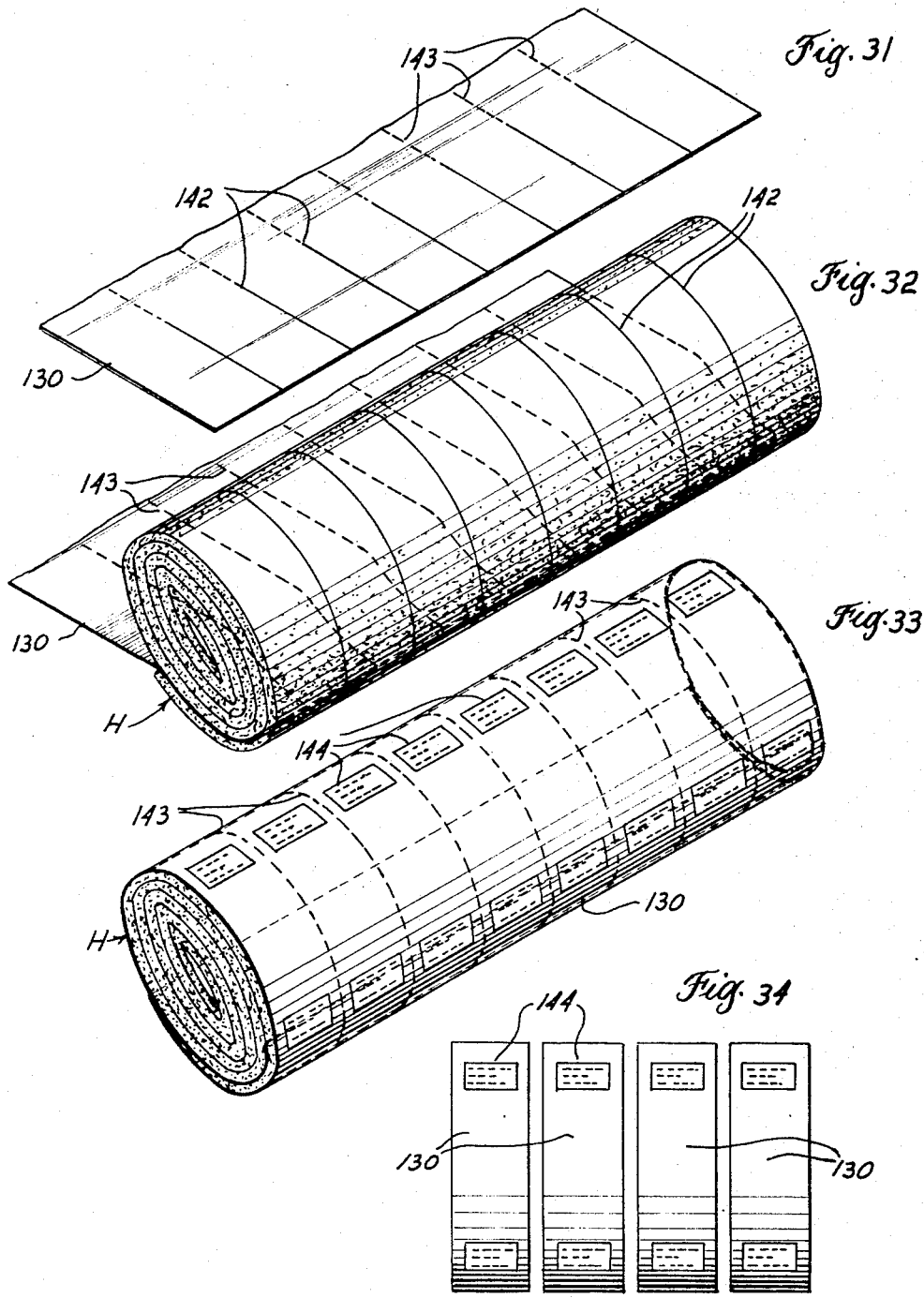

United States Patent Office 3,429,681
Patented Feb. 25, 1969

1

3,429,681
APPARATUS FOR PRODUCTION OF GLASS FIBERS
Sidney Krakauer, Glen Cove, N.Y., Solomon Musikant, Mountaintop, Pa., and David J. Rosenberg, Glen Cove, N.Y., assignors to Certain-Teed Fiber Glass Corporation, Ardmore, Pa., a corporation of Maryland
Filed Dec. 17, 1965, Ser. No. 514,475
U.S. Cl. 65—9                                                    6 Claims
Int. Cl. C03b 37/10; C04b 43/02; B32b 17/00

ABSTRACT OF THE DISCLOSURE

Equipment for use in making glass fiber blanket including a furnace having a pair of parallel forehearths supplying glass to a pair of rows of attenuator assemblies. The attenuator assemblies are individually movable in a horizontal direction between operative and inoperative position and fuel supply lines are provided for the attenuator assemblies and are jointed on vertical axes to accommodate the horizontal movement of the assemblies. The glass fibers produced are laid in a blanket on a travelling conveyor and are thereby carried through a binder curing oven. Mechanism is provided in line with the conveyor to package fiber blanket in rolls, and alternatively operable mechanism is provided to a side of the conveyor to package blanket bats in bundles.

---

This invention relates to production of glass fibers and products therefrom and although not limited thereto, the invention is of particular applicability to the production of glass fiber blanket such as incorporated in building insulation and to the production of such insulation incorporating the fiber blanket.

One of the major objectives of the present invention is to increase the effectiveness and efficiency of utilization of the required components or devices incorporated in a glass fiber production line. Such a production line ordinarily includes a glass furnace with forehearth, glass fiber spinning and attenuating equipment, a binder applying system, a fiber laydown conveyor, a curing oven and other appurtenant devices, including for example a means for applying a paper or other sheet backing to the fiber blanket and also packaging mechanisms. All of this equipment represents a substantial investment and it is therefore important to obtain maximum and the most effective use of the equipment.

In conformity with the foregoing general objective, the invention has in view the arrangement of the equipment in a manner providing unusually high production capacity in relation to the overall size or length of the production line, and of certain of the components thereof, including, for example, the forehearth arrangements of the glass furnace, and the curing oven.

In accomplishing the foregoing general objective, the invention also provides a novel forehearth arrangement in which a pair of forehearths are arranged in parallel relation, each forehearth delivering glass for spinning to a series or row of spinning devices similarly arranged in parallel relation, preferably with the spinners in one row staggered in relation to the spinners in the other row. In this way particularly effective glass fiber distribution is achieved in the blanket being formed, even where the blanket is of substantial width, which is desirable for various other reasons some of which are brought out hereinafter.

In accordance with another aspect of the invention, provision is made for further improving the uniformity of distribution of the fiber laydown on the laydown conveyor, notwithstanding the production of a blanket of substantial width, by a novel arrangement of fiber laydown hood intervening between the laydown conveyor and the two rows of spinning and attenuating assemblies, separate means being provided for effecting distribution of the fibers introduced into the hood from the assemblies in each row. The fiber distribution means for each row of attenuating assemblies are arranged to distribute fibers from the assemblies of that row throughout more than half the width of the blanket being formed. Since this distributing action is taking place with reference to each of the two separate rows of spinning and attenuating assemblies, with the assemblies of one row in staggered relation to those in the other row, highly effective and uniform distribution of fibers in the blanket is achieved notwithstanding the production of a blanket of increased width, as compared with many prior glass fiber production lines.

In accordance with another important aspect of the invention, provision is made for the employment of a single endless belt serving not only for fiber laydown, but also as the conveyor means for carrying the blanket through the curing oven. This has a number of advantages including the fact that by employing a single conveyor for the purposes indicated, it is not necessary to handle or transfer the blanket in uncured condition from one conveyor to another. This is important in reducing irregularities, defects and breakages of the blanket being formed.

Moreover, by employing a single belt for the purposes of both fiber laydown and binder curing, and by construction of the belt itself in the manner herein disclosed, preferably of a metal mesh, the problem of cleaning the belt is greatly facilitated, for several reasons. First, since the binder carried through the system by the fibers is cured in the oven in a region of conveyor travel ahead of entry of the conveyor into the return run, the quantity of resin and other adherent foreign materials carried by the conveyor into the return run is much less than in the case of a conveyor employed for fiber laydown only. Where the conveyor is used for fiber laydown only, the binder still remains as a highly sticky mass and substantial quantities of the binder, together with much larger quantities of fibers and foreign matter are carried by the conveyor into the return run and thus are required to be cleaned from the conveyor before re-entry of the conveyor into the fiber laydown hood.

Thus, with the arrangement of the invention, a small quantity of binder and foreign material remains on the conveyor, so that it is only that small quantity which is required to be removed from the conveyor. This factor contributes to making practicable the employment of a metal mesh conveyor belt, as is also contemplated in accordance with the invention. Still further, the concurrent use of a conveyor common to both fiber laydown and over curing and construction of the conveyor of a metal mesh makes possible effective cleaning of the conveyor in a novel manner, by employment of burners associated with the return run of the conveyor belt, without resort to various chemical or other mechanical cleaning systems.

In addition to the foregoing, it is of advantage to employ a metal mesh as the conveyor for carrying the blanket through the curing oven because the mass of such a metal mesh conveyor is much less than in the case of a conveyor made up of structural bars or the like; and the reduction in the mass of the conveyor itself provides for much more rapid cooling and reheating of the parts as is desirable from time to time for maintenance and other purposes.

Still other objects of the invention relate to the provision of improved vacuum equipment for enhancing the uniformity of fiber laydown on the conveyor and also improved hot air handling and distributing equipment associated with the binder curing oven.

In accordance with another feature of the invention provision is made for application of a paper or other backing sheet to the blanket formed and also for the slitting of the blanket into a plurality of insulation strips, as well as the cutting of the strips into appropriate lengths as may be desired either for producing rolls of insulation strip material or packages of batts of the insulation. In accordance with this feature of the invention provision is made for alternatively directing the slit and cut strips either to a mechanism for rolling up the strips to form rolls of insulation or to a mechanism for packaging batts, the changeover from one form of packaging to the other being provided for without interrupting the feed in the production line.

How the foregoing and other objects and advantages are attained will appear more fully from the following description referring to the accompanying drawings illustrating a preferred embodiment of equipment according to the present invention. In the drawings:

FIGURES 1a and 1b taken together comprise an elevational view of a glass fiber production line constructed according to the present invention, with certain of the components illustrated more or less diagrammatically and also with certain of the components shown in vertical section;

FIGURES 2a and 2b, taken together show the equipment of FIGURES 1a and 1b in plan, some parts here also being shown diagrammatically and some being broken out to illustrate others lying below;

FIGURE 3 is a greatly enlarged horizontal sectional view taken substantially as indicated by the section line 3—3 on 1a and also as indicated by the section line 3—3 shown in FIGURE 4 and illustrating portions of a glas melting furnace, with forehearths associated therewith in accordance with the present invention;

FIGURE 4 is an elevational view on a large scale of certain portions of some of the glass fiber spinning and attenuating assemblies, this view also showing portions of the furnace and of one of the forehearths in vertical section, as indicated by the section line 4—4 on FIGURE 3;

FIGURE 5 is a plan view of two series of spinning and attenuating assemblies arranged in accordance with the invention, the view being taken as indicated by the line 5—5 on FIGURE 4, but being on an enlarged scale as compared with FIGURE 4;

FIGURE 6 is a view of portions of the equipment shown in FIGURE 5, FIGURE 6 being taken from the bottom of FIGURE 5, as indicated by the line 6—6 thereon;

FIGURE 7 is a fragmentary view illustrating a trough and certain other parts employed for carrying away unused molten glass taken as indicated by the section line 7—7 on FIGURE 6;

FIGURES 8, 9 and 10 are enlarged transverse sectional views through the trough shown in FIGURE 7 and taken respectively as indicated by the section lines 8—8, 9—9, and 10—10;

FIGURE 11 is a further enlarged plan view of one of the chutes for handling waste molten glass;

FIGURES 12 and 13 are sectional views of details taken as indicated by the lines 12—12 and 13—13 on FIGURE 11;

FIGURE 14 is a transverse vertical sectional view through the fiber laydown hood and the conveyor and vacuum chambers below the hood, the view being taken as indicated by the line 14—14 on FIGURE 1a and being on an enlarged scale.

Figure 29:
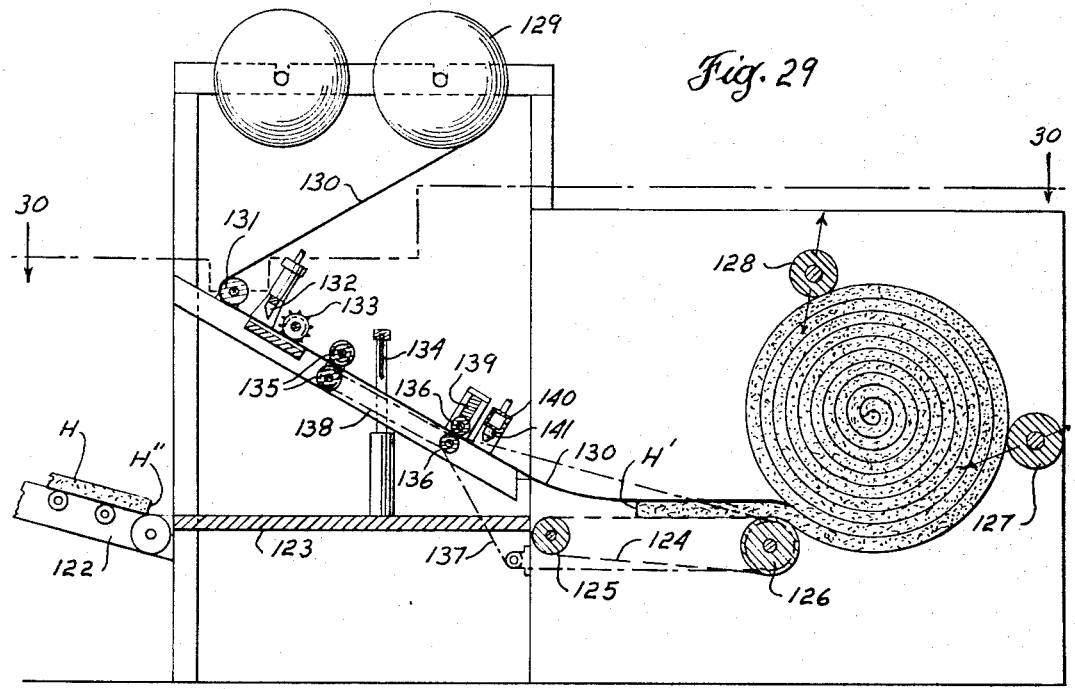
Figure 30:
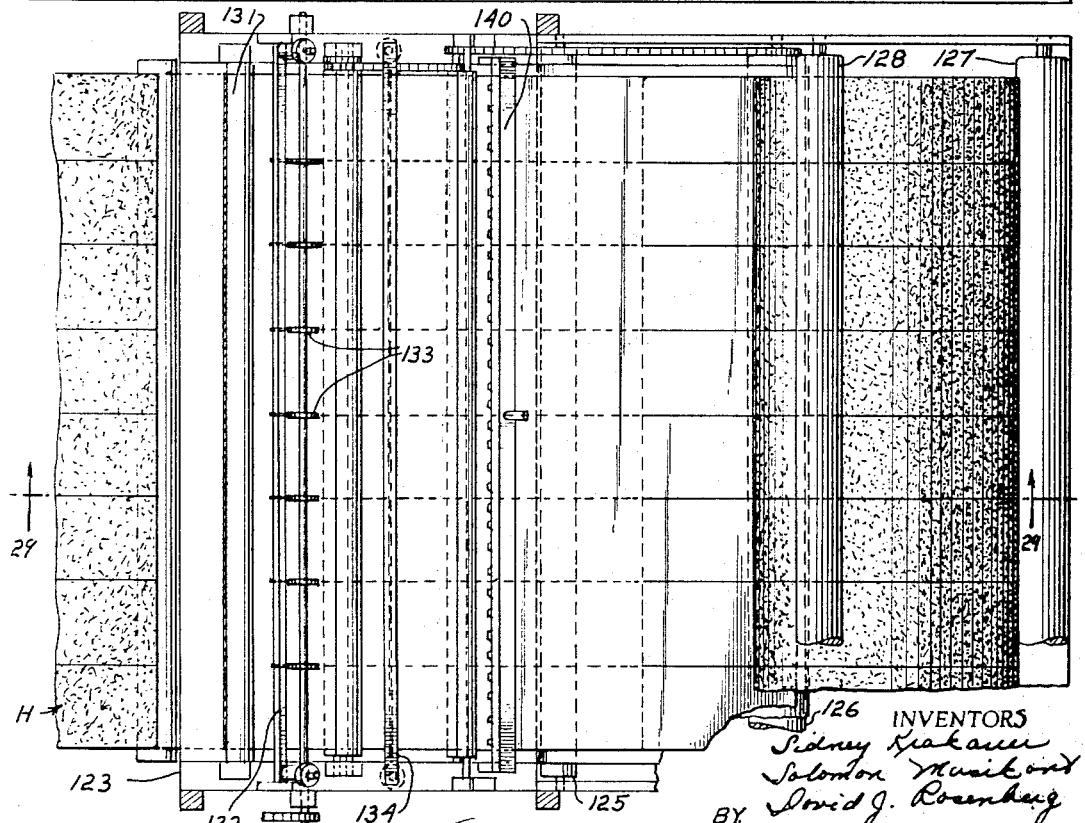

FIGURE 15 is a vertical sectional view taken transversely of the path of feed through the binder curing oven shown in FIGURES 1a and 2a, the view being taken as indicated by line 15—15 on FIGURE 16 and being on an enlarged scale as compared with FIGURES 1a and 2a and particularly illustrating certain of the flow passages for the heated binder curing air;

FIGURE 16 is a horizontal sectional view of the equipment shown in FIGURE 15 the view being taken as indicated by the line 16—16 on FIGURE 15;

FIGURE 17 is a transverse sectional view taken as indicated by the line 17—17 on FIGURE 15;

FIGURES 18, 19 and 20 are views illustrating certain magnetic devices for supporting the lower run of a metal mesh conveyor belt used in the binder curing oven which is shown generally in FIGURES 1a and 2a, FIGURE 18 being taken as indicated by the line 18—18 on FIGURE 20, FIGURES 19 and 20 being taken respectively as indicated by the lines 19—19 and 20—20 on FIGURE 18;

FIGURE 21 is a side elevational view on an enlarged scale illustrating certain drive and slack take-up rolls associated with conveyor belts appearing on FIGURE 1a;

FIGURE 22 is a view taken as indicated by the line 22—22 on FIGURE 21;

FIGURE 23 is an enlarged detailed view of a mechanism for raising and lowering one of the conveyor belts shown in FIGURE 1a;

FIGURE 24 is an elevational view taken as indicated by the line 24—24 on FIGURE 2b, the view being on an enlarged scale and illustrating an insulation batt packer adapted to be employed in association with the equipment of the invention;

FIGURES 25, 26, 27 and 28 are transverse sectional views taken as indicated by the section lines 25—25, 26—26, 27—27, and 28—28 as applied to FIGURE 24, and showing the sequence of batt folding steps accomplished by the equipment of FIGURE 24;

FIGURE 29 is a vertical sectional view through the insulation roll-up appearing at the righthand end of FIGURE 1b, FIGURE 29 being on an enlarged scale and having various parts shown in vertical section as indicated by the section line 29—29 on FIGURE 30;

FIGURE 30 is a plan view of parts shown in FIGURE 29 the view being taken as indicated by the line 30—30 on FIGURE 29;

FIGURE 31 is a fragmentary view of a portion of a paper or other wrapping sheet adapted to be applied to a roll by the device illustrated in FIGURES 29 and 30;

FIGURES 32 and 33 are isometric views of a roll at successive stages of wrapping;

FIGURE 34 is an elevational view of separate or separated packages of insulation obtained from a roll such as shown in FIGURE 33; and FIGURE 35 (appearing on Sheet 4 along with FIGURE 4) is a somewhat diagrammatic view of an arrangement for applying resin or other binder material to the fibers being made and representing a modification of the arrangement for that purpose shown in FIGURE 4.

In considering the drawings, attention is first called to FIGURES 1a–1b and 2a–2b, and to the following brief description of the general arrangement of the several components of the production line as illustrated in these particular figures.

At the extreme left of FIGURES 1a and 2a a glass melting furnace is indicated at A. The furnace is provided with a pair of forehearths extended from a side or end of the furnace, the forehearths being indicated at B. The forehearths serve to deliver streams of molten glass to individual fiber spinning and attenuating assemblies which are arranged in two groups or rows indicated at C and D. These assemblies deliver attenuated glass fibers downwardly and the streams of downwardly descending fibers are supplied with a thermo-setting binder by spray devices indicated generally at E, the fibers then entering the hood F which is arranged above the fiber laydown conveyor G. The fibers build up in the form of a blanket on the conveyor G, the blanket being indicated at H. The conveyor G extends not only beneath the hood F but also travels through the binder curing oven I in which the binder is cured or set.

The lower portion of the oven I is made up of a plurality of supply chambers for hot air, these chambers being generally indicated in FIGURE 1a at J and in the upper portion of the oven off-takes are provided as indicated at K in FIGURE 2a for collecting and exhausting the hot gases after passing through the blanket H.

The blanket H (see FIGURES 1b and 2b) is slit at the stage indicated at L, and thereafter the strips of the blanket formed by the slitting are coated with strips of paper or other sheet materials supplied for instance at the stage indicated at M. The strips may be cut at desired intervals by a cutting knife indicated at N. Thereafter the paper-coated strips may alternatively be delivered either to an insulation roll-up unit indicated at O, or to a batt packer indicated at P. The stage in the production line indicated at Q represents a double decker conveyor station serving certain purposes as described more fully hereinafter in connection with the alternative delivery of the cut strips either to the roll-up unit O or to the batt packer P.

The letter R indicates a mechanism providing for application of a wrapping sheet or strip to rolls of insulation being rolled up in the unit O.

With the foregoing general description of the major components of the production line or system in mind, attention is now directed to the following description of individual components and parts especially as illustrated in the more detailed figures of the drawings.

Portions of the glass melting furnace A are illustrated toward the left in FIGURES 3 and 4. Various details of the construction of the furnace itself form no part of the present invention per se and are therefore not fully described herein. However, it is noted that the furnace is constructed of a known type of refractory and is adapted to be heated by burning fuel in the furnace, the fuel being introduced through appropriate nozzles. A gas take-off is, of course, also provided.

In accordance with the invention, the furnace is provided with a pair of forehearth, which are indicated in general in the drawings by the numerals 1 and 2. These forehearths communicate with the mass of molten glass within the furnace through openings 3 and 4, the flow from the furnace into each forehearth being controlled by a gate 5 which is arranged so that the passage from the furnace into the forehearth is located below the surface of the glass in the furnace, thereby avoiding delivery of surface impurities into the forehearth.

From FIGURE 3 it will be noted that the points of communication of the two forehearths with the furnace are symmetrically arranged with respect to the end wall of the furnace, and are both also located at points somewhat spaced from the corners of the furnace. This is desirable in order to ensure uniform flow conditions and thereby provide for the delivery into the forehearths of molten glass of uniform characteristics, including temperature.

Each of the forehearths 1 and 2 are provided with a series of outlet openings 6, six being provided in each. The outlet openings in each forehearth are uniformly spaced and provide for delivery of streams of molten glass downwardly to the fiber spinning and attenuating assemblies referred to herebelow. It is here noted, however, that the outlets 6 in one forehearth are staggered with relation to the outlets 6 in the other forehearth, for a reason which will be brough out more fully herebelow.

The series or rows of fiber spinning and attenuating assemblies C are positioned to receive molten glass streams from the outlets 6 of the forehearth 2, and the series of spinning and attenuating assemblies D are similarly positioned to receive the streams of molten glass delivered from the outlets 6 of the forehearth 1. The details of construction of spinning and attenuating assemblies need not here be considered but it is briefly noted (see especially FIGURE 6) that each one of the assemblies includes a spinner or rotor 7 mounted at the lower end of a rotating shaft 8 which is journalled within the assembly and provided with a driving motor. The shaft 8 is hollow and its upper end is open to receive the stream of molten glass such as indicated at 9 in FIGURE 6. The glass descends through the hollow rotor mounting shaft 7 and is delivered by the perforated distributor cup 10 to the interior of the rotor 7 which latter is provided with a multiplicity of apertures in its peripheral wall through which fine streams of molten glass are centrifugally expelled. Surrounding the lower portion of each spinning and attenuating assembly is a combustion chamber 11 having an annular discharge orifice 12 just above and outboard of the peripheral wall of the rotor, so as to deliver an annular stream of hot gases downwardly in position to impinge upon the fine streams of glass expelled through the apertures in the peripheral wall of the rotor. The details of the construction of such a spinning and attenuating assembly need not be considered herein but various features of such an arrangement are disclosed in our copending application Ser. No. 390,654, filed Aug. 19, 1964, issued as Patent No. 3,347,648 on Nov. 17, 1967. It is here mentioned, however, that the annular attenuating gas stream results in attenuation of the fibers and projection of them downwardly into the hood, the entrance portions of which are indicated at 13 in FIGURE 6, the hood being described herebelow with particular reference to FIGURE 14.

Each of the assemblies C and D is mounted between pairs of supporting I-beams 14 and the assemblies are each provided with supporting rollers 15 riding on tracks carried by the I-beams, so that the assemblies may be shifted horizontally between the normal operating position in alignment with the streams of molten glass 9 and a position displaced outwardly from the operating position. This displacement movement is provided in order to facilitate servicing of the assemblies, especially the periodic replacement of the spinners or rotors.

As best seen in FIGURES 5 and 6 provision is made for the feed of fuel to the attenuator combustion chambers 11 through supply lines which are specially formed and arranged to provide ease of displacement movement of the assemblies without disconnection of any fuel line joints. For this purpose, the combustion chambers of the several assemblies C and D are supplied with fuel from the main indicated at 16 at the top of FIGURE 6, this main having two branches 17 and 18. Branch 17 serves to supply the several vertical feedlines 19 associated with the row of assemblies D and branch 18 serves to supply the several vertical feedlines 20 associated with the row of assemblies C. Each of the feedlines 19 and 20 is provided with a shut-off valve 21 and each is further provided with several joint parts including three joints providing for relative motion of the connected parts about vertical axes as indicated in FIGURE 6 at $x$—$x$. The location of these three axes is also indicated by three dots marked $x$ on one of the feedlines 19 shown in FIGURE 5. Each of the feedlines 19 and 20 is further provided with a control valve 22 at a point closely adjacent the combustion chamber for the attenuator and this valve may be used for regulating the quantity of gas delivered to the attenuator combustion chamber.

By the arrangement described just above provision is made for withdrawing any one of the assemblies from normal operating position, the fuel feedline flexing to accommodate this motion in the manner which will be apparent from inspection of FIGURES 5 and 6, an attenuator indicated at D′ being shown in fully displaced position in each of these two figures, and an attenuator D″ being shown in FIGURE 5 at a position about halfway withdrawn from the normal operating position.

Each spinning and attenuating assembly is also provided with a water supply ring 23 (see FIGURE 4) having appropriate nozzles for spraying water inwardly toward the rotor 7, and further with a binder supply ring 24 having nozzles for spraying liquid thermo-setting binder inwardly to impinge upon the descending attenuated fibers and thus coat the fibers. This binder is subsequently cured in the oven described herebelow.

The water and binder supply rings 23 and 24 are mounted as parts of the assemblies and are preferably provided with flexible hose-type supply connections (not shown) which are flexed upon displacement movement of the assemblies between normal operating position and the inactive position. Still further an electric power line would normally be connected to each assembly in order to power the electric motor incorporated in the assembly for driving the rotor shaft.

With respect to the foregoing arrangements for mounting the assemblies C and D and for supplying them with fuel, power, water and binder, it is to be noted that with the arrangement as illustrated and described, no substantial forces are imposed upon the assembly either in its operating position or its displaced position, tending to move the assembly to the opposite position. This is of advantage in simplifying service and maintenance work, including particularly the periodical replacement of the spinner or rotor 7, which is accomplished by withdrawing the assembly from the operating position and then substituting a new rotor.

When one of the assemblies is to be withdrawn from normal operation, it is important to divert and carry away the molten glass of the stream 9 which normally is used in the assembly being withdrawn. This waste or diverted glass is sometimes referred to as "cullet." For this purpose in accordance with the present invention a trough 25 is extended along and below the forehearth 2 at the inner side of the row of assemblies C, and another trough 26 is similarly extended along and below the forehearth 1 at the inner side of the assemblies D (see FIGURES 5 to 10 inclusive). These two troughs communicate with a downwardly directed chute 27 (FIGURES 6 and 7), interconnecting passage means 28 being provided. Water is introduced into the troughs by means of supply connections 29 associated with the righthand end of the troughs as viewed in FIGURES 5 and 7, and this water supply means sets up a continuously flowing stream of water in the troughs adapted to cool the cullet and carry it with the water. For each of the discharge openings 6 of each forehearth, a cullet chute 30 is provided, each chute being pivoted by means of the vertical pivot 31 at a point adjacent to the trough into which the chute is adapted to deliver cullet. Each chute 30 is thus mounted for pivotal motion between a position in which its upper inlet end is displaced toward one side of the stream of molten glass 9 and a position to intercept that stream before it reaches the upper entrance end of the spinning and attenuating assemblies which is positioned below. From FIGURE 6 it will be noted that each cullet chute is so positioned as to clear the upper end of the assemblies even when the assembly occupies its normal operating position. The swinging motion of each chute 30 is effected by means of an operating piston and cylinder device 32 which is shown in FIGURES 5 and 7, and in FIGURE 5 two of the chutes 30 (at the left side of the system) are shown at 30a in position to intercept the glass streams 9 for the two spinning and attenuating assemblies which are shown at D' and D", fully displaced and partly displaced from the operating position.

As best seen in FIGURES 7 to 11, the upper inlet end of each chute is provided with a section of pipe 33 to which water is supplied, for instance by means of a hose connected with one end of the pipe section, the pipe also having (see FIGURES 11, 12 and 13) certain ports 34 and 35 for introducing water into the inlet end of the chute. The opening 35 is desirably of substantial size in order to deliver a stream of water substantially to the point at which the stream of molten glass would strike the wall of the chute, the openings 34 being distributed so as to deliver water to other areas of the lower portions of the chute. This water delivery system is important in order to prevent sticking and building up of cullet within the chute. Molten glass will not flow readily upon a metal surface such as the wall of the chute 30, but will flow readily upon a film of steam, and the introduction of the water into the upper end of the chute provides for development of such a film of steam at the surface of the chute and also provides a body of downwardly flowing water aiding in cooling and transporting the glass, so that the cullet will readily flow downwardly and into the water trough 25 or 26. The flow of water through the trough will then serve to carry the cullet therewith to the downwardly directed discharge 27, through which the water and cullet are carried away. From FIGURE 5 it will also be observed that the chutes 30a (which are those in the position to intercept the streams of molten glass descending from the forehearth) are extended at an oblique angle to the major axis of the trough 26, the angle being such as to introduce the cullet into the trough with motion in the general direction of water flow through the trough. Each trough is also desirably provided with additional water inlets indicated at 36, and still further with pivoted covers 37 providing convenient access to the trough at any of a multiplicity of points in order to facilitate access in the event of clogging or jamming of any of the cullet in the troughs.

Below the forehearths and the two rows of spinning and attenuating assemblies C and D, the attenuated fibers produced are delivered into a hood indicated generally at F in FIGURES 1a and 2a and shown in greater detail in FIGURES 4 and 14. This hood comprises end walls 38 and 39 and side walls 40 and 41. In general these walls define a hood of approximately square box-shape, and the hood also includes central walls 42 arranged in the upper portion thereof in order to divide the upper region of the hood into two passages indicated by the arrows 13. The hood is open at the bottom just above the conveyor 43 which serves as the base on which the fibers are layed down in order to build up a fiber blanket. The belt 43 desirably comprises a metal mesh endless belt supported by a series of rollers 44 in the region below the hood F.

At their upper edges, the side walls 40 and 41 of the hood are supported by pivots 45 (FIGURE 14) providing for swinging movement of the lower edges of the side walls inwardly and outwardly. In FIGURE 14 the walls 40 and 41 are shown close to their innermost positions, and dotted lines 40a and 41a indicate positions of adjustment swung outwardly. The hood walls 40 and 41 may be shifted in position by the adjusting screws 46. At their lower edges, each side wall 40 and 41 carries a pair of pulleys 47 serving to mount an endless belt 48 which advantageously has an internal V-shaped ridge 49 riding in the V-shaped groove 50 of the pulleys 47 and thus serving to maintain the belt in its proper position with the inner run thereof substantially in the plane of the inner surface of the hood wall. These belts act as forming devices for the side edges of the blanket being layed down on the conveyor 43 at the bottom of the hood.

Toward the top of the walls 40 and 41, and also in the central walls 42 of the hood air or steam jets 51, 52, 53 and 54 are provided and serve to distribute the descending fibers over the surface of the conveyor 43 at the bottom of the hood.

The laying down of the fibers on the conveyor is assisted by drawing air and gases downwardly through the conveyor, and for this purpose an exhaust or suction box 55 is provided below the conveyor (see FIGURES 1a and 14), the suction box having dividers therein as indicated at 56 in order to provide three suction chambers, each of which has a separate off-take 57. It will be noted that the three suction chambers extend across the conveyor 43 so that the suction applied to the fibers and blanket being built up may be varied progressively from left to right when viewed as in FIGURE 1a, according to the effect desired in the blanket being formed.

In accordance with the foregoing, a blanket is built up on the conveyor and is delivered therefrom the region below the hood toward the right when viewed as in FIGURE 1a, the blanket being there indicated by the letter H. From FIGURE 1a it will also be seen that at the lower edge of the front end wall 39 a roll 58 is mounted, this roll preferably lying close to the lower edge of the wall 39 and engaging the upper surface of the blanket H as it is delivered from the hood space. The roll 58 is vertically adjustable and serves, in effect, as a rolling gate acting to diminish the entrance of air into the hood under the lower edge of wall 39 and thus aiding to preserve the action of the suction box below the conveyor.

Attention is now called to the fact that the conveyor belt 43 serves not only for fiber laydown at the bottom of the hood F but serves also to carry the fiber blanket formed to and through the binder curing oven I. As seen in FIGURES 1a, 21 and 22, the belt 43 passes through the oven and then over a supporting roll 59 from which the belt passes over the top of roll 60 and thence over an idler roll 61 which is adjustably movable by means of shiftable blocks 62 thereby providing for slack take-up in the conveyor 43. The rolls 59 and 60, with the bight of the conveyor around them provides for drive of the belt, these two rolls (59 and 60) being intergeared and being driven by means of the motor 63 (see FIGURE 2a).

In its return run the belt 43 is supported below the oven by means of supporting rollers 64, a short vertical run being provided between rollers 65 and 66, for a purpose to be explained, thereafter the belt passes to the left below the suction box 55 and then returns again to enter the space at the bottom of the hood F.

In the region of the oven an upper conveyor belt 67 also formed of metal mesh is supported by means of end rollers 68 and 69, so that the lower run of the belt 67 lies at the top surface of the blanket passing through the oven. The rolls 68 and 69 and also the top insulated wall 70 of the oven itself are mounted upon a frame structure incorporating beams 71. Roll 68 is adjustably mounted on the frame members 71 by means of mechanism indicated at 68a for the purpose of taking up slack in the belt 67. The frame of these upper parts of the oven is vertically adjustable by means of four screws 72, in order to provide for regulation of the space between the upper run of the lower conveyor and the lower run of the upper conveyor. This enables control of the blanket thickness and of the compression applied to the blanket during the curing of the binder thereon.

The jack screws should be driven synchronously in order to raise and lower all four corners of the frame structure of the upper part of the oven concurrently and thereby retain the lower run of the belt 67 parallel to the upper run of the conveyor 43. Although this parallelism may be secured by mechanically coupling the four jack screws together, in the preferred practice according to the invention, these jack screws are provided with electrical rather than mechanical coupling. One of the jack screws 72 appears in FIGURE 23 together with electrical operating equipment therefor. This need not be considered in detail herein, but it is noted that the jack screw is provided with a follower nut arranged in the unit 73 and the nut is adapted to be operated by the hydraulic servo-motor 74 which in turn is driven by a synchronous motor 75. Preferably each of the four jack screws is provided with a drive system of this type and preferably also the synchronous motors are of the synchronously stepping type so that when they are all connected to the standard alternating current line they will step in synochronism with each other. By applying power to all four of these units at the same time, only relatively small motors are required to drive the hydraulic servo-followers, the servo-followers providing the power multiplication required to move the mechanism.

Attention is now further directed to FIGURES 21 and 22 which illustrate the driving interconnection between the driving roll 60 for the lower belt 43 and the driving roll 69 for the upper belt 67. The driving motor 63 (FIGURE 2a) is connected through suitable reduction gearing to the shaft 60a of the roll 60. This shaft is also provided with a gear 76 meshing with gear 77 which constitutes an idler gear mounted on shaft 78 which is supported by pivotal links 79—79 mounted on the shaft 60a. Shaft 69a is also mounted by pivotal links 80—80 which are mounted on the shaft 78. Shaft 69a is provided with a gear 81 meshing with the idler gear 77. The foregoing gearing arrangement provides for delivery of power to both the upper and the lower conveyor belts 43 and 67 from a common source of power and also provide for drive of these two belts in synchronism, as is desired in order to avoid creeping of the belts with reference to the blanket being carried through the heating or curing oven. The pivotal links 79 and 80 for mounting the idler gear 77 accommodate the movement of the upper belt 67 when the jack screws 72 are adjusted, this being accomplished in the manner clearly indicated in FIGURE 21 where two positions are shown, one in full lines and the other in dot-and-dash lines.

The lower part of the oven is made up of a series of transversely extending hot air ducts or units the arrangement of which appears in greater detail in FIGURES 15, 16 and 17 to which reference is now made, along with the general showing in FIGURES 1a and 2a. At the bottom of the oven there is provided an insulating wall or lagging 82. A perforate top wall or deck 83 is provided above the bottom wall 82 in spaced relation, the deck 83 serving to support the upper run of the conveyor 43, as is indicated in FIGURES 15 and 17. The space or chamber between the bottom wall 82 and the deck 83 is divided by a series of transversely extending vertical partitions 84, thereby forming a multiplicity of individual transverse ducts or chambers through which the hot air for curing the binder is introduced.

Each of the transverse chambers formed between the partition 84 is divided into lower and upper parts by a septum comprising an apertured plate 85 with small adjustable valve plates 86, thereby forming a lower gas inlet chamber 87 and an upper gas outlet chamber 88. The plate 85 is perforate and the flow from the lower or inlet portion of the chamber to the upper or outlet portion of the chamber may be regulated by relatively shifting the position of the valve plates 86 in order to close off more or less of the perforations or apertures through the plate 85. The heated air passes upwardly from the outlet chamber 88 through the perforations provided through the top deck 83 and thence through the mesh belt 43 and into and through the blanket of fibers carried through the oven by the belt.

The admission of hot air into the inlet passages 87 is controlled by means of dampers 89 which are arranged in passages 90 supplied from headers which appear also in FIGURE 2a. As seen in FIGURE 2a, the various passages 90 are associated in groups with three separate headers 91, 92 and 93. Proceeding from left to right as viewed in FIGURE 2a, the header 91 feeds three of the passages 90, the header 92 feeds five of the passages 90, and the header 93 feeds ten of the passages 90. The headers are provided respectively with air supply ducts 94, 95 and 96, and with blowers 97, 98 and 99 by means of which heated air is forced into the headers 91 and thence into the passages 90, the inlet chambers 87 and the outlet chambers 88 for delivery through the blanket carried by the conveyor.

By dividing sections or units of the hot air supply system into the groups in the manner illustrated, hot air at different temperatures and also at different feed rates may be caused to flow through the fiber blanket in different regions or zones of the oven. As seen in FIGURES 1a and 2a, the space above the lower run of the conveyor belt 67 and below the top insulated wall 70 is divided by means of partitions 100, 101 and 102, the divided spaces corresponding to the zones which are respectively fed from headers 91, 92 and 93. Separate off-takes are provided for each of these three zones. As shown in FIGURE 2a the off-take from the first zone (fed by header 91) includes a pair of connections 103 and a duct 104. A similar pair of connections 105 is associated with the zone between partitions 100 and 101 and are connected with the duct 106. The larger zone between partitions 101 and 102 is provided with two pairs of connection 107 each pair delivering to exhaust duct 108. The off-takes 104, 106 and 108 are preferably provided with vertical slip joints in order to accommodate the vertical motion of the upper portion of the oven with which these off-takes are associated.

The foregoing hot air handling system associated with the oven I provides for effective and efficient treatment or curing of the blanket, particularly the heating or curing of the binder on the fibers. In a typical operation in which the binder comprises a phenolformaldihyde resin, the first section of the oven would advantageously be operated at 600° F., the second section at about 400° F. and the third section at about 350° F. These temperatures are given only by way of example and it is to be noted that the arrangement of the invention is of advantage since it provides great flexibility with respect to the curing conditions established in the several zones. These condtions will be varied according to a number of other factors including the nature of the binder employed, the thickness of the blanket, etc. In general, by employing a relatively high temperature in the first zone or section of the oven, the moisture or water on the fibers (present as a result of the use of water as solvent for the binder applied) may be driven off without raising the temperature of the blanket excessively. It will be noted that this first zone is relatively short as compared with the succeeding zones. In the second zone, an intermediate temperature may be used in order to rapidly advance the curing of the binder. This second zone thus aids in bringing the temperature of the blanket and of the binder to be cured on the fibers up to a desired curing temperature but without overheating, this second zone being of intermediate length. Finally the binder is maintained at a desired curing temperature, for instance close to 350° F. in the case of a phenolformaldehyde resin binder, during the passage of the blanket through the third zone which it will be noted is of greater length than either of the other two zones.

Attention is now called to the fact that as shown in FIGURES 1a and 2a, a chamber is provided between the last partition 102 and the roll 69 at the end of the upper conveyor, this chamber being provided with an off-take duct 109 and an exhaust fan 110. This zone is located beyond the last of the hot air supply sections or chambers provided below the conveyor 43 and this serves to draw off remaining quantities of moisture and also other vapors which may be present in the blanket as a result of the curing, prior to the time the blanket is delivered to the succeeding sections of the production line for further processing.

Another structural arrangement provided within the oven I is described just below with particular reference to FIGURES 1a, 18, 19 and 20.

Since the belt 67 desirably comprises a mesh type of metal belt (in order to afford maximum cross sectional flow area for the hot air to pass through the belt and thence through the blanket), in the absence of provision to the contrary, the lower run of the belt 67 would sag and thereby tend to impair the desired preselected spacing between the upper and lower belts within the oven, with consequent deformation of the blanket itself being cured in the oven. In order to avoid this sagging of the lower run of the upper belt provision is made for magnetically supporting the lower run of the upper belt. In general the arrangement provided for that purpose conforms with the disclosure of our copending application Ser. No. 390,655, filed Aug. 19, 1964, issued as Patent No. 3,242,-527 on Mar. 29, 1966. Here, however, instead of employing rolling magnetic elements the magnetic supporting elements are nonrotative or stationary. Transverse supports 111 bridge the space between the side frame beams 71 on which the upper conveyor 67 is mounted. These transverse supports in turn carry transverse bars 112 which serve as carriers for short lengths of magnetic elements 113. Desirably the individual elements or bar magnets 113 are magnetized and are assembled with their poles oppositely oriented so that poles of like sign are juxtaposed transversely to the conveyor.

The foregoing arrangement provides for support of the lower run of the mesh conveyor belt 67 without any appreciable sagging, and since the upper run of the lower conveyor 43 is supported on the deck 83 of the hot air supply system, the two conveyor belts establish a channel having parallel upper and lower walls in which the blanket is fed through the oven. Since the upper conveyor is adjustable the channel may be adjusted in height to accommodate blankets of different thickness during curing of the binder.

As delivered from the righthand end of the oven described above the fibers of the blanket are adherent because of the curing or heating of the binder, and this blanket now passes into the additional devices and equipment illustrated in general in FIGURES 1b and 2b. The blanket which is indicated at H first enters the slitter indicated at L, and this serves to divide the blanket into insulation strips of appropriate width and also to effect edge trimming where that is needed. It is here noted, however, that with employment of the side forming belts 48 at the lower side edges of the hood F (see FIGURES 1a and 14) the quantity of edge trimming is minimized and indeed may even be eliminated with certain types of blankets, for instance those of relatively dense or compressed character.

The blanket is delivered from the slitter L to the next station at which a web, for instance a paper web such as indicated at 114 is first coated on one side with an adhesive for instance an asphalt type adhesive, by means of the applicator 115, and is then applied to the under side of the blanket by means of the roll 116. Advantageously the web 114 comprises a multiplicity of strips corresponding in width to the individual cut strips of the blanket resulting from the slitting at station L.

At station N a transverse cutter or shear is arranged for purpose of cutting off the formed strips at desired intervals according to the particular system or method of packaging to be employed. In the case of rolling up the strips to form insulation rolls, the slitted cut strips are delivered from station N onto a conveyor 117 which in turn delivers the material to conveyor 118 which is pivoted at 119 in order to provide freedom for upward and downward angular motion between the full line position shown in FIGURE 1b and the dotted line position which is indicated at 118a. Movement of this conveyor may be effected by one or more control piston and cylinder devices one of which appears at 120. With the conveyor 118 in the full line position the strips of insulating material are fed through the lower deck of the conveyor unit generally indicated at Q, being supported during passage therethrough on the supporting elements indicated at 121 which comprise driven rolls. The material is then delivered to a conveyor 122 which is inclined downwardly and which delivers the slit and cut strips over a table 123 (see also FIGURES 29 and 30) and thence to the upper run of an endless belt 124 supported by rolls 125 and 126. The roll 126 comprises one of a set of three rolls, the other two being indicated at 127 and 128, and the latter two being mounted for movement with respect to each other and with respect to the roll 126 so as to progressively enlarge the space between the three rolls and still maintain the three rolls approximately at equal angular interspacing about the center of the roll of insulation being formed between the rolls 126, 127 and 128.

The roll 126 and thus the conveyor belt 124 is driven at a speed higher than the normal rate of advancement of the blanket H along the remainder of the production line. In this way the trailing end of a series of insulation strips being rolled up, as indicated at H' advances beyond the leading end H" of the next succeeding set of strips. This provides an opportunity for removal of one set of rolls of insulation from the roll-up equipment before the leading end of the next set of strips comes to the position for initiating the next rolling-up operation.

Preferably the rolling-up equipment at the end of the production line also includes mechanism for applying a wrapper to the outside of each strip of insulation being rolled up. This mechanism is indicated in general by the letter R in FIGURES 1b and 2b and is shown in somewhat greater detail in FIGURES 29 and 30. Here it will be seen that a supply roll of wrapping paper is arranged at 129, the paper 130 from this roll passing around a guideroll 131 and thence past a row of slitters 132 and a row of perforators 133. Slitters 132 and perforators 133 are provided in accordance with the number of strips of paper to be delivered to the roll-up equipment and thus in accordance with the number of strips of insulation being rolled up.

One of the perforators is arranged along the same line as the slit formed by one of the slitters 132 and the perforators may remain in constant engagement with the paper, the knives 132 being brought into engagement with the paper selectively during a certain portion of the feed of a length of paper employed for a given wrapping operation. This will be explained more fully herebelow but it is first noted that the wrapper feeding equipment further includes a transverse cutter 134 by means of which the paper web 130 may be cut off at the desired intervals to provide for wrapping of each group of rolls of insulation. This cutting knife 134 is adapted to engage the paper in a region between a pair of rolls 135 and another pair of rolls 136. The lower roll 136 is driven from roll 126 by means of a belt 137 and lower roll 135 is in turn driven from lower roll 136 by a belt 138. The upper roll 136 is yieldingly mounted by means of a spring 139 so that the paper web may be advanced and drawn away from the rolls 136—136, notwithstanding the drive of the lower roll 136 with roll 126. Just beyond the rolls 136—136 an adhesive supply system is provided including a transverse supply duct 140 and a series of spray nozzles 141 adapted to deliver adhesive to the paper wrapper as it is being advanced to the rolls of insulation to be wrapped.

The operation of the foregoing wrapping mechanism is considered just below in connection with FIGURES 31 to 34, as well as FIGURES 29 and 30.

When a series of rolls of strips are approaching completion of the roll-up operation, which is the condition illustrated in FIGURE 29, the leading end of the web of wrapping paper 130 is slit by means of the knives 132 at points indicated in FIGURE 31 at 142, and this slitted leading end is inserted into the roll under the trailing end of the insulation strip H' (see FIGURE 29). As rotation of the group of rolls proceeds, the trailing end of the insulation H' is wrapped onto the outer surface of the roll overlying the slitted leading end of the wrapper paper 130. Beyond the zone of overlapping of the insulation with the wrapper paper, the paper is perforated by means of the perforators 133, along lines representing continuations of the slits 142, as indicated at 143 in FIGURES 31 to 33.

The wrapping operation continues until the wrapper extends entirely around the rolls and overlaps somewhat, and in the region of this latter overlapping, the inner surface of this trailing end of the paper is coated with the adhesive or glue from the nozzles 141. In this way the outer wrapped end of the wrapping paper is adhesively secured to the rolls so that it will remain upon the rolls as a protective wrapping until the insulation is used. The perforations 143 are preferably continued all the way to the trailing end of the length of wrapping paper applied to a given group of rolls, and in this way provision is made for handling a batch of insulation rolls as a unit, while at the same time providing for ready separation thereof (see FIGURE 34) along the lines of perforation or scoring. The several rolls may be retained as a unit for purposes of storage and shipment and may even be shipped to an ultimate place of use, for instance a building site, before individual rolls are separated. If desired, printing or labeling may be applied as indicated at 144.

In addition to the capability of producing insulation rolls in the manner described above with reference to FIGURES 1b, 2b and 29 to 34, the invention also provides for the packaging of insulation material in the form of batts. For the purpose of packaging batts as seen in FIGURES 2b and 24, the batt packer includes a vertically elongated packing chamber 145 having a side opening 146 adjacent the bottom thereof opposite to a ram 147 which is adapted to be moved by a cylinder and piston device 148. Batts of insulation are introduced successively into the upper open end of the chamber 145 by mechanism to be described herebelow, and the stack of batts in the chamber 145 is compressed by a retractable platen 149 which is positioned to enter the packing chamber at the open rear side thereof (at the right side as viewed in FIGURE 24). The platen 149 is adapted to be projected into the packing chamber and withdrawn therefrom by means of a fluid pressure piston and cylinder device 150, and the assembly of the platen and device 150 is mounted on framing carried by means of rollers 151 on upright beams 152 so that the platen my be raised and lowered by the endless chain 153 supported on sprockets 154 and 155 at the top and bottom ends of the frame element 152. The lefthand run of the chain 153 is fastened to the frame or carriage provided for the platen, in view of which powered rotation of the sprocket 154 at the top as by motor 156 will cause the platen 149 to descend or rise according to the direction of operation of the drive mechanism.

The platen 149 serves to compress a stack or group of batts in the packing chamber, and after compression of the stack to a volume capable of being ejected through the discharge opening 146, the compressed stack is acted upon by the ram 147 so as to deliver the compressed stack into an open-ended batt receiving bag 158 (see FIGURE 2b) which is positioned to receive the compressed stack and thus provide a batt package.

In considering the sequence of operations of the batt packer, it is first noted that the batts are successively delivered into the packing chamber by mechanism described herebelow. As the platen 49 moves downwardly to compress the stack of batts in the chamber below the platen, additional batts are being introduced into the chamber above the platen, so that at no time is it necessary for the batts to drop downwardly in the chamber more than a short distance. In this way undesired turning or malpositioning of the batts is avoided. When the platen reaches the bottom of its compression stroke, as soon as the compressed stack has been delivered from the lower end of the packing chamber, the platen is withdrawn and immediately returned to the upper position, and then projected into the packing chamber in order to commence the compression of the stack of batts already in the chamber, and to support the newly arriving batts during the descending stroke of the platen.

The mechanism for feeding the batts into the upper end of the packing chamber is illustrated in FIGURES 1b, 2b and 24 to 28 inclusive. Referring first to the lefthand side of FIGURE 24 it will be seen that the mechanism includes conveyor 159 comprising a series of driven rolls, the conveyor being pivoted at 159a toward its righthand end so that the lefthand end may be raised and lowered between the full line position shown in FIGURE 24 and the dotted line position indicated at 159b. This oscillating motion of conveyor 159 may be effected by the fluid pressure power device 160. Turning now to FIGURES 1b and 2b, it will be seen that in the double deck conveyor section Q, in addition to the conveyor elements 121 another series or deck of conveyor elements 161 is provided, this latter series of elements being positioned to receive strips of insulation from the production line when the pivoted conveyor 118 is in its upper position indicatde at 118a.

When the batt packer is to be employed the two decks of the conveyor section Q are alternately loaded and at this time the cut-off knife is operated so as to produce strips of length equal to the length of the conveyor section Q for instance strips of about eight feet in length. When a set of such eight-foot strips has been delivered to one deck of the conveyor section Q, for instance the upper deck as shown in dotted lines in FIGURE 1b, the conveyor 118 is lowered to the full line position and starts to deliver an additional set of strips into the lower deck. During this delivery of strips to the lower deck, the fingers 162 which are supported from the transversely movable bar 163 are actuated in a direction transverse to the feedline in order to slide the strips of insulation transversely from the supporting elements 161 onto the conveyor 159, the individual strips of the insulation traveling on the conveyor edgewise in positions as indicated at 157 at the left of FIGURE 24. Each individual strip 157 delivered in this manner from the upper deck of the conveyor section Q is thereafter advanced through certain folding mechanism to be described, and delivered into the packing chamber, and after the strips 157 have left the conveyor 159, an additional group of strips has been delivered to the lower deck of the conveyor section Q and these, in turn, are pushed by fingers 164 carried by a push bar 165, so as to deliver this next group of strips onto the conveyor 159 when in the position indicated at 159a and ultimately to the batt packer. The conveyor 118 is moved upwardly and downwardly at appropriate intervals to continue the feed of groups of strips to the upper and lower decks of the conveyor section Q, and the batt packer is loaded with whatever number of batts is desired, according to the size of the bundles being produced.

Turning now to the mechanism for feeding the batts or strips from the conveyor 159 and to the packing chamber of the batt packer, attention is particularly directed to FIGURES 24 to 28 inclusive. As a batt, such as indicated at 157a, leaves the conveyor 159 it moves onto a conveyor belt 166 and as it advances, certain inclined supporting rods 167 arranged at each side commence a folding operation, as will be seen from inspection of FIGURE 26. During this folding operation the lower run of a conveyor belt 168 retains the mid-portion of the batt 157a in engagement with the upper run of the supporting conveyor 166. The frame for mounting conveyor 168 is pivoted at 168a so that the opposite end of the conveyor may be raised and lowered according to the thickness of the batts being handled, cabling 168b and a hand control 168c being provided for this adjustment of the conveyor 168.

At the delivery end of the conveyor 168 and of the supporting rods 167, upright conveyor elements 169 engage the edge portions of the strips or batts and continue the upward folding of the edges to the right angle position shown in FIGURE 27. In this region, free floating shoe 169a serves to hold the central portion of the strip down on the conveyor 166.

Thereafter additional conveyor belts 170 engage the right angled edge portions of the strips. These belts 170 are arranged to be supported toward one end by means of supporting rolls 171 which are arranged vertically and at the other end are supported by rolls 172 arranged horizontally so that the belts 170 twist 90° from the entrance end of this section of the folding mechanism to the delivery end thereof. This results in doubling or folding over of the edge portions of the strips in the manner clearly appearing in FIGURE 28, and at the delivery end of the conveyor belts 170, the folding is completed so that the batt comprises a piece of total length equal to one-half the length of the strip initially fed to the folding mechanism.

Attention is now called to the fact that at the upper open end of the packing chamber 145 a target wall 173 is provided in line with the path of feed of the strips through the folding mechanism. The various conveyors of the folding mechanism are desirably operated at a speed such as to project each folded batt edgewise against this target wall 173 whereupon each batt drops by gravity into the packing chamber in which they become stacked one upon the other for ultimate compression under the influence of the platen 149.

It is also to be observed in connection with the strip folding mechanism that the conveyors 166, 168, 169 and 170 are preferably operated at a speed substantially higher than that of feed of the blanket H in the production line itself.

Indeed the batts 157 are desirably taken from the conveyor 159 at a speed equal to twice the speed of production of blanket H in the production line, so that the batts 157 become separated from each other in advance of the feed thereof through the folding mechanism. This is accomplished by driving the rolls of the conveyor 159 at a speed to advance the individual strips 157 at a rate higher than they are delivered from the production line by the fingers 162 or 164, and this ensures that the strips will be spaced from each other on the conveyor 159 and throughout the folding mechanism. In this way the batts are sequentially fired against the target wall 173 leaving an interval of time between the delivery of each one, in order to provide time for each one to drop from the target wall onto the stack supported on top of the platen unimpeded by the succeeding batt.

In connection with the arrangement of the batt packer and the feed mechanism for the packer attention is called to the fact that this type of batt packaging is particularly effective in a system or production line in which the blanket is of considerable width, for instance width adequate to permit slitting to form eight strips. In this way the total number of pieces required for a given batt package is handled or accumulated at one time by one or the other of the decks of the double deck conveyor station Q above described.

The arrangement for feed and folding of the batts provides a steady stream of batts from the production line and with the sequence of batt packer operations contemplated, especially the stacking of batts on top of the platen 149 as it descends in the packing chamber, it is practical to adjust the number of batts introduced into individual packages. This is done by appropriate timing of the motion of the platen, especially the upward travel after compression of one stack and the reprojection of the platen into the packing chamber following the introduction of a predetermined number of batts.

From the foregoing it will be seen that the equipment of the invention provides for packaging the insulation produced alternatively in rolls or in packages of batts and the production may readily be changed over from one type of packaging to the other, without shutting down the production line, which is of great importance because of the desirability of establishing and maintaining uniform fiber production conditions all the way from the glass melting furnace through the spinning, fiber laydown and curing operations.

Attention is again called to the fact that in the production line described above a common conveyor, namely the metal mesh belt 43 is employed not only for fiber laydown in the hood F, but also for carrying the blanket from the hood to and through the curing oven I. This is advantageous for a number of reasons including the fact that no transfer of the blanket from one conveyor to another is required at a time prior to curing of the fiber binder. Prior to curing of the binder the blanket has little strength and can easily be damaged and even disrupted or broken.

In addition to the foregoing, the employment of a conveyor common to fiber laydown and fiber binder curing has a further advantage now to be pointed out. This has reference to the matter of cleaning the conveyor. Cleaning of fiber laydown conveyors has been a substantial problem in the production of glass fiber blanket, and this is particularly true where separate conveyors have been used in the laydown hood and the curing oven. Having in mind that the binder is essentially a sticky and highly adherent material prior to curing thereof, it will at once be seen that the laying down of fibers coated with such a binder upon the supporting elements of a conveyor results in fouling of the conveyor, filling of cracks and crevices not only with the binder but also with fibers, and with the binder in uncured condition, the adherence of the binder and fibers results in a difficult cleaning problem, especially because the travel of the conveyor through repeated circuits during the fiber laydown operation tends to build up these deposits of binder and fibers.

According to the present invention this problem is met by the use of a mesh conveyor common to fiber laydown and to the carrying of the blanket through the curing oven and by the concurrent further use of a special form of cleaning system for the mesh conveyor. Thus as seen in FIGURE 1a, two burners 174 and 175 are arranged to project a flame against the mesh belt 43. Each of these burners may suitably comprise a fuel supply pipe 176 together with a row of burner nozzles for developing a flame adapted to impinge against the mesh of the belt substantially throughout its width. One of these burners (174) is positioned to project a flame against the inner surface of the mesh belt in a run thereof extended generally vertically downward from the guideroll 65 to the guideroll 66. The other burner 175 is adapted to project its flame against the outer side of the mesh belt, i.e., the side on which the blanket is layed down and carried. Since the mesh conveyor travels from the laydown hood F into and through the binder and curing oven I portions of the binder which adhere to the mesh belt also become cured or hardened, and in this hardened condition they are more or less brittle and therefore more readily dropped from the mesh belt than when the binder is uncured, as it is at the time of exit of the mesh belt from the fiber laydown hood. After the curing action effected by passage of the conveyor through the curing oven, any adherent binder deposits are quite readily disintegrated by the heat of the cleaning burners 174 and 175, and as the mesh belt proceeds beyond the zone of the cleaning burners around and in contact with various of the guide rollers, the residue of the dried or burned binder readily flakes off in the manner of a powder.

The employment of cleaning burner flames in combination with the conveyor common to fiber laydown and oven curing therefore provides an effective and exceedingly simple system for cleaning the conveyor.

Burners for cleaning the upper mesh belt 67 are also provided, these being indicated at 177 and 178, each of these also being provided with a fuel supply manifold 179, and the two burners both being positioned in the upper or return run of the belt 67, as clearly appears in FIGURE 1a.

Just in advance of the entrance end of the oven, and directly beneath the roll 68 for supporting the upper belt 67, still another burner 181 supplied by manifold 182 is provided, this burner also including a row of burner outlets so as to develop a flame impinging against the belt substantially throughout its entire width. The purpose and functioning of the burner 181 is as follows:

First note that in the arrangement of the oven as fully described above, all of the hot air employed for binder curing passes upwardly through the conveyor belt 43 and upwardly through the blanket carried by the belt. This has a tendency to disengage the lower surface of the blanket from the top surface of the belt 43, the force of the hot air acting to hold the blanket up against the undersurface of the lower run of belt 67. The impingement of the flame from burner 181 against the belt and the blanket carried thereby just before entrance into the oven effects what might be termed "surface precure" at the underside of the blanket, and this substantially aids in maintaining the integrity of the blanket, preventing warpage of the lower surface thereof under the influence of the upwardly moving air streams which pass through the blanket in its travel through the oven. It is found that in this way fuzziness and irregularities of the lower surface of the blanket are avoided. The positioning of the burner 181 substantially directly beneath the roll 68 is desirable because at this point the roll 68 maintains the blanket in contact with the mesh belt 43 and therefore enhances the action of the burner 181.

FIGURE 35 illustrates a modified arrangement for applying or spraying binder resin on the fibers being formed by the spinning and attenuating assemblies D. FIGURE 35 is a somewhat diagrammatic plan view showing a series of assemblies D from which the fibers are downwardly projected. Instead of introducing the resin through inwardly directed nozzles arranged around rings such as shown at 24 in FIGURE 4, the resin is sprayed through holes provided in short straight lengths of pipe 183 one such pipe being located intermediate each adjacent pair of assemblies D and being provided with apertures for spraying the resin material in both directions therefrom. In addition a pipe 183 is located at the outer side of each assembly D at the ends of the row. A supply line 184 may serve to supply the resin to the two outermost pipes 183 and individual supply lines 185 may be employed for the other spray pipes. The projection of the resin spray generally in the direction of the row of the assemblies D, which would be lengthwise of the path of feed of the conveyor below the hood F, minimizes the amounts of resin which is sprayed upon the side walls of the hood and thereby minimizes adherence of resin and fibers to those side walls.

We claim:

1. Equipment for use in making glass fibers comprising a glass spinning rotor, a glass furnace with a forehearth positioned above and in spaced relation to the rotor and providing for delivery of a stream of molten glass downwardly through the intervening space and into the rotor, means providing for displacement of the rotor to an inactive position offset from said stream of molten glass, and mechanism for diverting the stream of molten glass including a water trough extended at one side of the rotor, an inclined chute having an upper inlet end and a lower delivery end and having its lower end positioned to deliver into the trough, mounting means for the chute including a generally upright mounting pivot spaced from the upper end of the chute and providing for pivotal movement of the upper end of the chute between a position to receive the stream of molten glass and a position clear of the glass stream, and means for introducing water into the chute in the upper inlet end portion thereof.

2. Equipment for use in making glass fibers comprising, in combination with a means for supplying a stream of molten glass, a fiber spinning and attenuator assembly including a spinning rotor and a combustion chamber for developing attenuating gas, mounting means providing for generally horizontal movement of the spinning and attenuator assembly between a position to receive the stream of molten glass and a position dispaced therefrom, the combustion chamber of the attenuator having a fuel inlet, and a fuel supply pipe connected with the fuel inlet, the supply pipe being jointed and having a plurality of serially connected joint parts interconnected by means of pivot joints having generally upright pivotal axes accommodating the horizontal movement of the spinning and attenuator assembly.

3. Equipment according to claim 2 and incorporating a plurality of spinning and attenuator assemblies arranged in two side-by-side rows and mounted for movement toward and away from each other, each assembly having a jointed fuel supply pipe in accordance with claim 2 but with the fuel supply pipes for the two rows of assemblies extended in opposite directions and away from each other.

4. In equipment for use in making glass fiber insulation and including a continuously moving carrier for feeding a continuously supplied glass fiber blanket, mechaninsm for longitudinally slitting the blanket into a plurality of strips, mechanism for transversely cutting the strips at selected intervals, and mechanism located in line with the feed path of the carrier for longitudinally rolling up cut strips, the improvement comprising mechanism located to one side of the feed path of the carrier beyond the slitting and cutting mechanisms for packaging cut strips in the form of stacked batts, and means in the feed path for alternatively delivering cut strips longitudinally to the rolling up mechanism and laterally to the batt packaging mechanism.

5. Equipment according to claim 4 in which the means for delivering the cut strips alternatively to the rolling up and batt packaging mechanisms comprises a double deck conveyor station, conveyor means receiving cut strips from the carrier and shiftable to convey the strips alternatively to the upper and lower decks of the conveyor station, a conveyor for delivering cut strips from one of the conveyor decks to the rolling up mechanism, and means for delivering groups of cut strips alternately from the upper and lower decks of the conveyor station to the batt packaging mechanism.

6. In equipment for use in making glass fiber insulation and including a continuously moving carrier for feeding a continuously supplied glass fiber blanket, mechanism for longitudinally slitting the blanket into a plurality of strips, mechanism for transversely cutting the strips at selected intervals, the improvement comprising superimposed accumulating conveyors for alternatively accumulating groups of cut strips, and mechanism for alternately packaging the accumulated groups of strips including a packaging chamber and means for sequentially folding the strips of each group and for feeding the folded strips to the packaging chamber.

References Cited

UNITED STATES PATENTS

| | | | |
|---|---|---|---|
| 2,165,280 | 7/1939 | Lannan | 65—4 XR |
| 2,316,451 | 4/1943 | Page | 65—9 |
| 2,583,779 | 1/1952 | Jones | 134—19 XR |
| 2,732,885 | 1/1956 | Van De Hoven | 65—4 |
| 2,961,698 | 11/1960 | Rea | 65—4 |
| 3,265,477 | 8/1966 | McCoppin | 65—6 XR |
| 3,337,669 | 8/1967 | Shannon et al. | 65—4 XR |

DONALL H. SYLVESTER, *Primary Examiner.*

ROBERT L. LINDSAY, *Assistant Examiner.*

U.S. Cl. X.R.

65—2, 4, 11